(12) United States Patent
Kumagai et al.

(10) Patent No.: US 9,733,076 B2
(45) Date of Patent: Aug. 15, 2017

(54) ROTARY LASER EMITTING APPARATUS AND LASER MEASUREMENT SYSTEM

(71) Applicant: Kabushiki Kaisha TOPCON, Tokyo (JP)

(72) Inventors: Kaoru Kumagai, Tokyo (JP); Junichi Kodaira, Tokyo (JP); Fumihiko Kamizono, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 408 days.

(21) Appl. No.: 14/502,632

(22) Filed: Sep. 30, 2014

(65) Prior Publication Data

US 2015/0092182 A1    Apr. 2, 2015

(30) Foreign Application Priority Data

Sep. 30, 2013 (JP) ................................ 2013-203867

(51) Int. Cl.
*G01C 3/08* (2006.01)
*G01C 3/02* (2006.01)
(Continued)

(52) U.S. Cl.
CPC ............... *G01C 3/02* (2013.01); *G01B 11/14* (2013.01); *G01B 11/26* (2013.01); *G01C 15/004* (2013.01); *G01D 5/34707* (2013.01)

(58) Field of Classification Search
CPC ...... G01B 11/14; G01B 11/26; G01C 15/004; G01C 3/02; G01D 5/34707
(Continued)

(56) References Cited

U.S. PATENT DOCUMENTS 5,742,387 A * 4/1998 Ammann ............. G01C 15/004
                                            33/1 CC
6,646,732 B2 * 11/2003 Ohtomo ............... G01C 15/004
                                            356/139.05
(Continued)

FOREIGN PATENT DOCUMENTS

CN        1434269 A       8/2003
CN      101023322 A       8/2007
(Continued)

OTHER PUBLICATIONS

Search Report issued in corresponding European Application No. 14186577.4, mailed Feb. 23, 2015 (8 pages).
(Continued)

*Primary Examiner* — Mark Hellner
(74) *Attorney, Agent, or Firm* — Osha Liang LLP

(57) ABSTRACT

A rotary laser emitting apparatus that rotates and emits a laser beam comprises an emission-side control unit that controls an entire operation of the apparatus, a laser emitting mechanism that emits the laser beam while rotating an irradiation optical axis that is an emission direction of the laser beam, and a rotating direction detecting unit that detects a rotating direction of the irradiation optical axis. The emission-side control unit generates a rotating posture signal showing the rotating direction of the irradiation optical axis detected by the rotating direction detecting unit and drives the laser emitting mechanism for superimposing the rotating posture signal on the laser beam.

8 Claims, 16 Drawing Sheets

(51) Int. Cl.
  *G01C 15/00* (2006.01)
  *G01B 11/14* (2006.01)
  *G01B 11/26* (2006.01)
  *G01D 5/347* (2006.01)
(58) Field of Classification Search
  USPC .................................................... 356/4.01
  See application file for complete search history.

(56) References Cited

U.S. PATENT DOCUMENTS

| | | |
|---|---|---|
| 2003/0068257 A1 | 4/2003 | Yamazaki et al. |
| 2003/0136901 A1 | 7/2003 | Ohtomo et al. |
| 2008/0075227 A1 | 3/2008 | Christoph et al. |
| 2008/0297921 A1 | 12/2008 | Kodaira |
| 2013/0298413 A1 | 11/2013 | Kehl et al. |
| 2015/0030121 A1 | 1/2015 | Christoph et al. |

FOREIGN PATENT DOCUMENTS

| | | |
|---|---|---|
| CN | 101144717 A | 3/2008 |
| EP | 1174682 A2 | 1/2002 |
| EP | 2453204 A1 | 5/2012 |
| EP | 2573580 A2 | 3/2013 |
| JP | 2001-205848 A | 7/2001 |
| JP | 2003-065762 A | 3/2003 |

OTHER PUBLICATIONS

Office Action issued in corresponding Chinese Application No. 201410515655.2, mailed May 23, 2016 (7 pages).

\* cited by examiner

ROTARY LASER EMITTING APPARATUS AND LASER MEASUREMENT SYSTEM

CROSS-REFERENCE TO RELATED APPLICATION

This application claims priority under 35 USC 119 from Japanese Patent Application No. 2013-203867 filed on Sep. 30, 2013, the disclosure of which is incorporated by reference herein.

BACKGROUND OF THE INVENTION

Field of the Invention

The present invention relates to a rotary laser emitting apparatus that rotates and emits a laser beam, and a laser measurement system using the same.

Description of the Related Art

For example, in the measurement of the civil engineering work or the like, a rotary laser emitting apparatus that rotates and emits a laser beam is known. In the rotary laser emitting apparatus, the laser beam that is emitted with being rotated from the rotary laser emitting apparatus is reflected on a target, and an inclination angle and a height of the target to a plane vertical to a rotating axis of the rotary laser emitting apparatus are measured based upon the reflected laser beam (for example, refer to Japanese Patent Laid-Open No. 2003-65762).

In addition, in the above-mentioned measurement, it is known to use a laser measurement system that is provided with a rotary laser emitting apparatus and a laser receiving apparatus that receives a laser beam from the rotary laser emitting apparatus to enable measurement of a position of the laser receiving apparatus on a basis of the rotary laser emitting apparatus.

This laser measurement system can measure a high-low angle and a height to an irradiation optical axis of the rotary laser emitting apparatus in the position where the laser receiving apparatus is installed, based upon a received light signal of the laser beam in the laser receiving apparatus.

SUMMARY OF THE INVENTION

In the conventional laser measurement system as described above, however, it is necessary to use the other measuring device together therewith for figuring out the position of the laser receiving apparatus in the rotary direction around the rotating axis of the rotary laser emitting apparatus.

An object of the present invention is to provide a rotary laser emitting apparatus and a laser measurement system that can easily figure out a position of a laser receiving apparatus in the rotary direction around a rotating axis of the rotary laser emitting apparatus.

For achieving the above-mentioned object, there is provided a rotary laser emitting apparatus according to an aspect of the present invention, which rotates and emits a laser beam, comprising an emission-side control unit that controls an entire operation of the apparatus, a laser emitting mechanism that emits the laser beam while rotating an irradiation optical axis that is an emission direction of the laser beam, and a rotating direction detecting unit that detects a rotating direction of the irradiation optical axis. The emission-side control unit generates a rotating posture signal showing the rotating direction of the irradiation optical axis detected by the rotating direction detecting unit, and drives the laser emitting mechanism for superimposing the rotating posture signal on the laser beam.

BRIEF DESCRIPTION OF THE DRAWINGS

FIG. 6A to FIG. 6D are explanatory diagrams for explaining an outline of the measurement in the laser measurement system, wherein FIG. 6A shows a scene where the rotary laser emitting apparatus (the emission unit) is in a position equal to a height of the laser receiving apparatus (the light receiving unit), FIG. 6B shows an appearance state of the received light by the laser receiving apparatus in the state in FIG. 6A, FIG. 6C shows a scene where the laser receiving apparatus (the light receiving unit) is in a height position higher than the rotary laser emitting apparatus (the emission unit), and FIG. 6D shows an appearance state of the received light by the laser receiving apparatus in the state in FIG. 6C.

FIG. 10A to FIG. 10C are graphs for explaining an example of an appearance state where a received light signal from the light receiving unit changes by optical beam state detection processing in the received light signal processing unit of the laser receiving apparatus, wherein FIG. 10A shows a received light signal from the light receiving unit with output intensity at a vertical axis and with time at a horizontal axis, FIG. 10B shows a received light signal converted to a digital signal by ADC with output strength at a vertical axis and with time at a horizontal axis, and FIG. 10C shows a component ratio of frequency in the received light signal with intensity at a vertical axis and with frequency at a horizontal axis.

FIG. 11A to FIG. 11C are explanatory diagrams for explaining an appearance state of a change in a positional relation of an emission unit in a laser emission mechanism that is an emission location of the rotary laser emitting apparatus to the respective support columns, wherein FIG. 11A shows a state where an emission unit housing (laser emitting mechanism) is not inclined to a body case, FIG. 11B shows a state of FIG. 11A as viewed in a direction vertical to an irradiation optical axis, and FIG. 11C shows a state where the emission unit housing (laser emitting mechanism) is inclined to the body case.

FIG. 12A to FIG. 12D are graphs for explaining a light shielding area As and a light shielding area As', wherein a vertical axis shows a high-low angle that is found on a basis of a reference plane (zero degrees) as viewed from an emission unit of the laser emitting mechanism, and a horizontal axis shows a horizontal angle that is found on a basis of a position (zero degrees) where a support column is provided in the rotating direction (horizontal angle direction) around a center axis (rotating axis) of the emission unit housing as viewed from the emission unit of the laser emitting mechanism, wherein FIG. 12A shows a light shielding area As in a state where the emission unit housing (laser emitting mechanism) is not inclined to the body case, FIG. 12B shows a light shielding area As in a state where the emission unit housing (laser emitting mechanism) is inclined to the body case, FIG. 12C shows a light shielding area As' in consideration of only a state where the emission unit housing (laser emitting mechanism) is not inclined to the body case, and FIG. 12D shows a light shielding area As' in consideration of all of states where the emission unit housing (laser emitting mechanism) is inclined to the body case.

FIG. 14A and FIG. 14B are explanatory diagrams for explaining an execution state of inclination adjustment processing in the laser measurement system in the present embodiment and the conventional method in the laser measurement system, wherein FIG. 14A shows the appearance state of the inclination adjustment processing and FIG. 14B shows the conventional method.

FIG. 15A and FIG. 15B are explanatory diagrams showing an appearance state where a position in which an irradiation optical beam crosses the laser receiving apparatus (light receiving unit) changes by alternation of a reference plane, wherein FIG. 15A shows an appearance state where the position changes from Direction Dc1 to Direction Dc2 by the inclination adjustment processing, and FIG. 15B shows an appearance state where the position changes from Direction Dc1 to Direction Dc3 by the conventional method.

EMBODIMENTS OF THE INVENTION

Hereinafter, a laser measurement system and a rotary laser emitting apparatus according to an embodiment of the present invention will be in detail explained with reference to the accompanying drawings.

Figure 1:
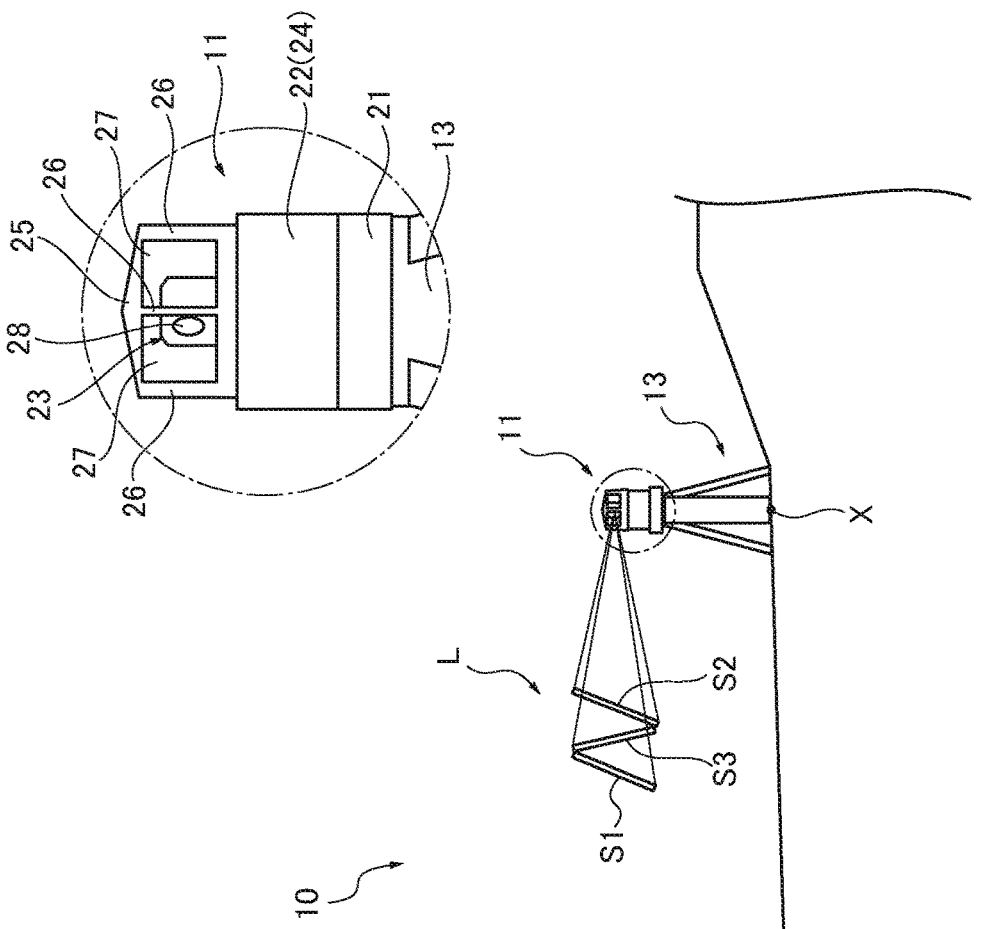
FIG. 1A is an explanatory diagram showing a laser measurement system in a diagrammatic manner according to an embodiment of the present invention.
FIG. 1B is an enlarged diagram of a rotary laser emitting apparatus used in the laser measurement system shown in FIG. 1A.

A laser measurement system 10 as one embodiment of a laser measurement system according to the present invention will be explained hereinafter with reference to FIG. 1A to FIG. 15B. The laser measurement system 10 in the present embodiment, as shown in FIG. 1A and FIG. 1B, includes a rotary laser emitting apparatus 11 as one embodiment of a rotary laser emitting apparatus according to the present invention, and a laser receiving apparatus 12. In the laser measurement system 10, the rotary laser emitting apparatus 11 is installed in a known point X, and the laser receiving apparatus 12 is installed in a location for measurement. In addition, in the laser measurement system 10, the rotary laser emitting apparatus 11 rotates and emits a measuring laser beam L at a constant speed, and the laser receiving apparatus 12 receives the measuring laser beam L emitted toward itself and calculates the received light signal, thus measuring a position of the laser receiving apparatus 12 (location for measurement) on a basis of the rotary laser emitting apparatus 11 (known point X).

The rotary laser emitting apparatus 11 is mounted on a tripod stand 13 installed on the known point X to be installed on the known point X. The rotary laser emitting apparatus 11 has a base 21 that forms part of a mounting location to the tripod stand 13, a body portion 22 that is fixed to the base 21, and a rotary body 23 that is rotatably provided in the body portion 22. The rotary laser emitting apparatus 11, as described later, rotates the rotary body 23 at a constant speed inside the body portion 22, and emits the measuring laser beam L from a pentaprism 54 (emission unit (refer to FIG. 3 and the like), which will be described later, provided in the rotary body 23 to rotate and emit the measuring laser beam L (irradiation optical beams S1, S2, and S3 to be described later).

Figure 2:
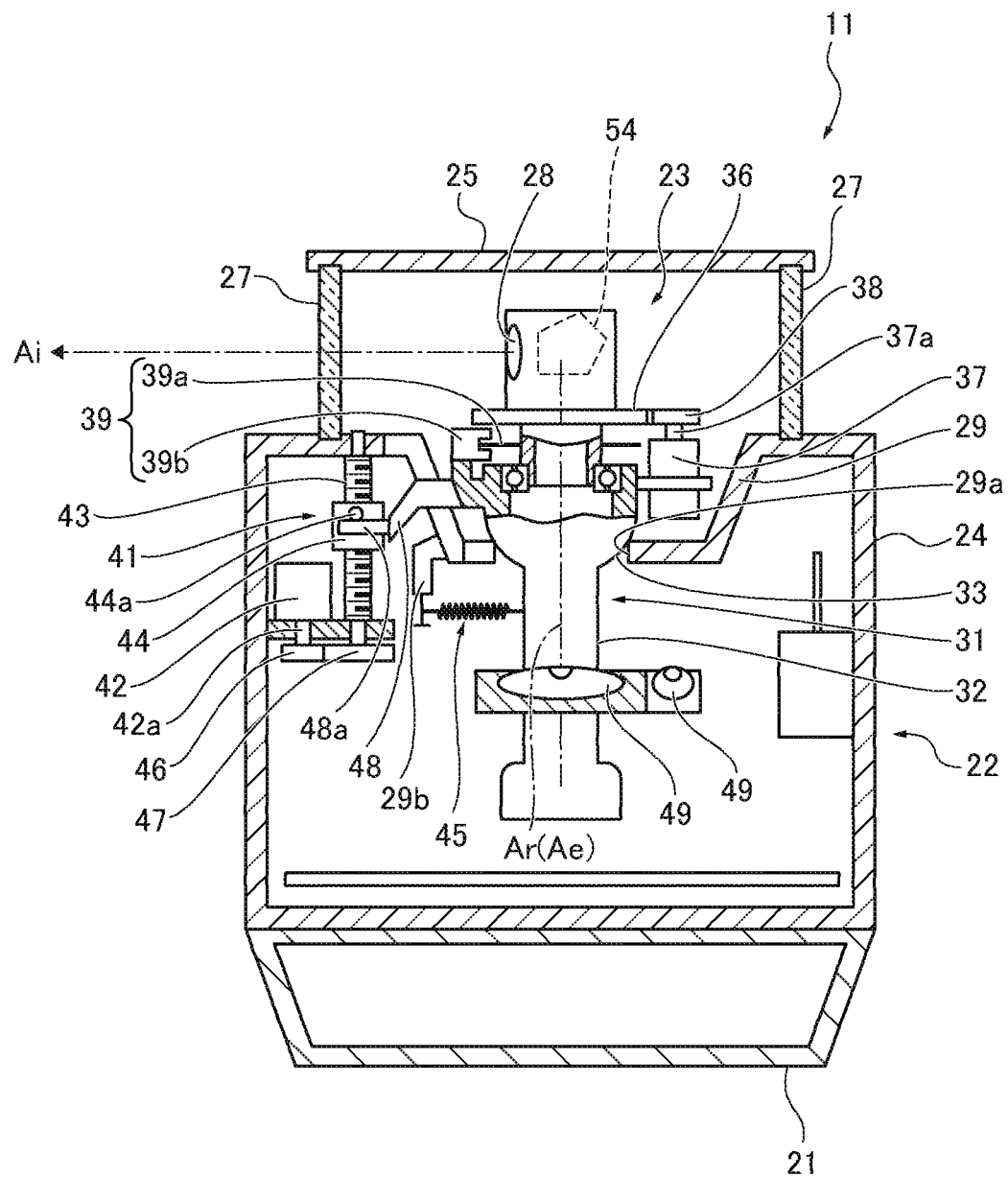
FIG. 2 is an explanatory diagram showing the configuration of the rotary laser emitting apparatus in the laser measurement system in a diagrammatic cross section.

The rotary laser emitting apparatus 11, as shown in FIG. 2, has a body case 24 in which the body portion 22 that is fixed on the base 21 is formed in a cylindrical shape as a whole, and an exterior part of the body portion 22 is formed by the body case 24. The body case 24 is provided with a ceiling portion 25 on the upper part. The ceiling portion 25 covers the upper part of the rotary body 23 (pentaprism 54) for protection and water proof of the rotary body 23 (pentaprism 54 provided in the rotary body 23 and described later (emission unit of a laser emitting mechanism 31 (refer to FIG. 3)). The ceiling portion 25 is provided in the body case 24 through four support columns 26 that are provided by equal intervals with each other in the present embodiment (refer to FIG. 1 and the like)

The support columns 26 each are formed in a columnar shape extending straight in a vertical direction in a state where a center axis of the body case 24 is directed in the vertical direction, and positional relations of the support columns 26 to the center axis of the body case 24 are equal to each other. The body case 24 is provided with four cover members 27 to close up a space between the body case 24 and the ceiling portion 25. Each cover member 27 is formed of a material allowing transmission of the measuring laser beam L that is emitted from the laser emitting mechanism 31 to be described later, and is formed in a rectangular plate shape to bridge over between two adjacent support columns 26 of the four support columns 26. Therefore the body case 24 is provided with an emission location formed between the body case 24 and the ceiling portion 25 for emitting the measuring laser beam L from the laser emitting mechanism 31 (the emission unit (pentaprism 54)).

The body case 24 is provided with the rotary body 23 accommodated therein to position an emission window 28 provided in the rotary body 23 to the emission location. The emission window 28 enables the measuring laser beam L from the laser emitting mechanism 31 that is emitted from the pentaprism 54, which will be described later, accommodated in the rotary body 23 to pass through the rotary body 23 outward (refer to FIG. 3). The body case 24 is provided with a recessed portion 29 in a conical body shape on a central part of the upper surface, and the recessed portion 29 is provided at a center with ahead cut-off through hole 29a that penetrates therethrough in the vertical direction. The body case 24 is provided with the laser emitting mechanism 31 through the through hole 29a of the recessed portion 29.

The laser emitting mechanism 31 has an exterior part that is formed by an emission unit housing 32 having a cylindrical shape longer in the vertical direction as a whole. The emission unit housing 32 accommodates components (laser beam emitting unit 51, a collimator lens 52, which will be described later, and the like (refer to FIG. 3)) therein for emission in the laser emitting mechanism 31, and is provided with a spherical seat 33 on the upper part. The spherical seat allows the emission unit housing 32 (laser emitting mechanism 31) to be inclined to the body case 24, and forms a location where the emission unit housing 32 (laser emitting mechanism 31) is supported in the through hole 29*a* (the inner peripheral edge portion) of the recessed portion 29. The emission unit housing 32 is provided with the rotary body 23 at an upper end thereof.

Figure 3:
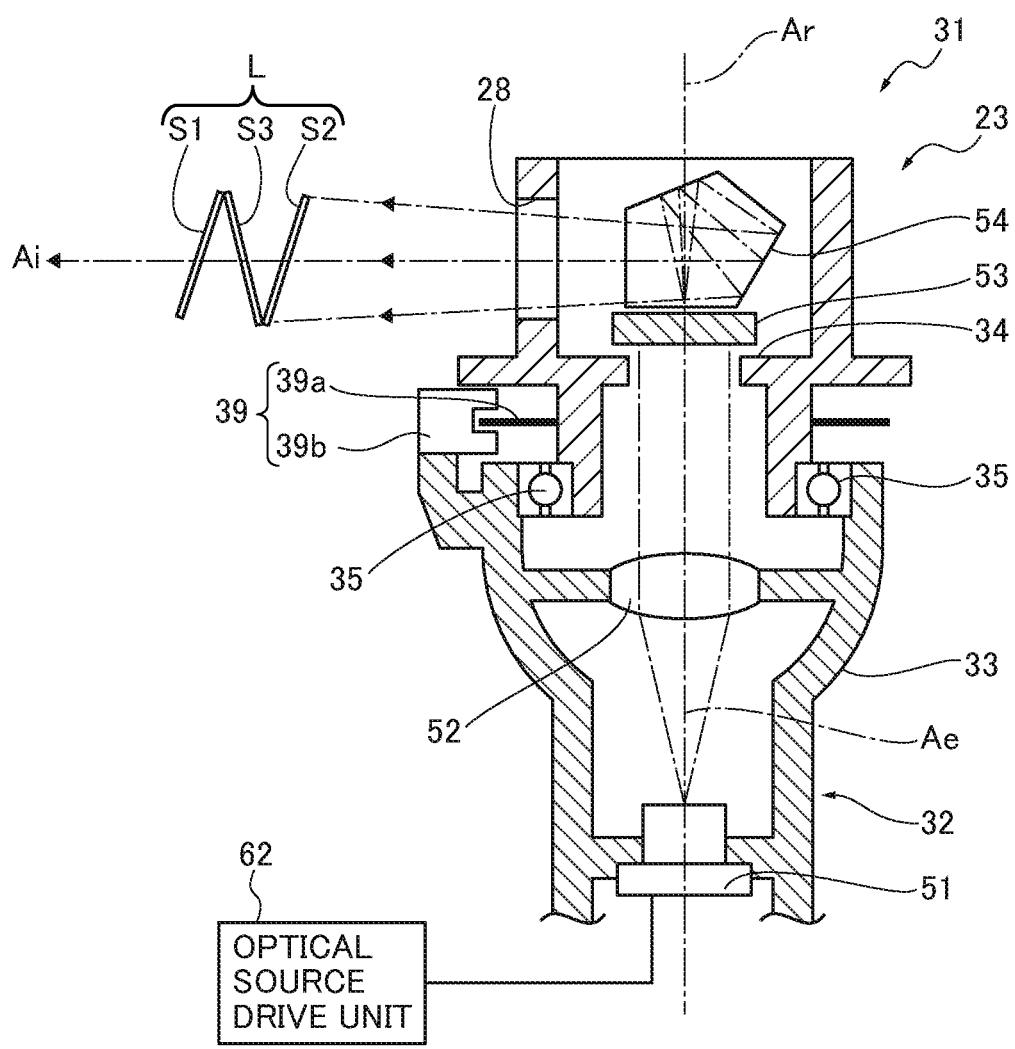
FIG. 3 is an explanatory diagram showing the configuration of a laser emitting mechanism in the rotary laser emitting apparatus in a diagrammatic cross section.

The rotary body 23, as shown in FIG. 3, has a cylindrical shape, and is provided with a plate-shaped diameter-reduction portion 34, which deforms inside to narrow an inner diameter dimension thereof, in an intermediate position as viewed in the vertical direction. The diameter reduction portion 34, as described later, forms a location where a diffracting grating 53 is provided, and allows the measuring laser beam L emitted from the laser beam emitting unit 51 to be incident to the diffracting grating 53. The rotary body 23 has a lower end that is mounted on the upper end of the emission unit housing 32 through a bearing member 35, and can rotate around a center axis (emission optical axis Ae to be described later) of the emission unit housing 32 as a rotation center to the emission unit housing 32. Therefore the center axis (emission optical axis Ae) of the emission unit housing 32 forms a rotating axis Ar in the rotary body 23 (the emission window 28), that is, in the laser emitting mechanism 31 for rotary emission.

The rotary body 23 is, as shown in FIG. 2, provided with a scan gear 36, and the emission unit housing 32 is provided with a scan motor 37. The scan motor 37 is driven to output rotation drive power through a rotary shaft portion 37*a*, and is driven through a rotation drive unit 63 (refer to FIG. 4) under control of an emission-side control unit 61 to be described later as needed. In the scan motor 37, a drive gear 38 is mounted on the rotary shaft portion 37*a*. The drive gear 38 is geared to the scan gear 36 that is provided in the rotary body 23. The rotary body 23, when the scan motor 37 provided in the emission unit housing 32 is driven, is driven and rotated around the rotating axis Ar as the rotation center to the emission unit housing 32 by transmission of the rotation drive power to the rotary body 23 through the drive gear 38 and the scan gear 36.

An encoder 39 is provided between the rotary body 23 and the emission unit housing 32. The encoder 39 includes a slit disc 39*a* that is provided in the rotary body 23, and an optical detector 39*b* that is provided in the emission unit housing 32. The optical detector 39*b* has a pair of projecting sections having a positional relation of vertically interposing a part of the slit disc 39*a* therebetween, and is configured to detect a signal (light or the like) that is emitted from one projecting section with the other projecting section. The slit disc 39*a* is formed with a material that blocks transmission of the signal (light or the like) that is emitted from the one projecting section, and is provided with a plurality of slits that are formed at equal intervals in the circumferential direction and allow transmission of this signal (light or the like). In the encoder 39, when the rotary body 23 is driven and rotated relative to the emission unit housing 32, the slit disc 39*a* rotates and transfers relative to the emission unit housing 32, that is, the optical detector 39*b* following the relative rotation, which intermittently allows detection of a signal (light or the like) by the optical detector 39*b* through the plurality of slits of the slit disc 39*a*. Therefore, the encoder 39 outputs rotation detection signals with repetition of high-low waveforms (refer to the upper waveform in FIG. 8) with rotation of the rotating body 23 relative to the emission unit housing 32.

A pair of inclination mechanisms 41 (one thereof is not shown) are provided in the body case 24 provided with the emission unit housing 32 therein. The pair of inclination mechanisms 41 are provided for controlling an inclination and a direction of the emission unit housing 32 relative to the body case 24. The emission unit housing 32, as described above, can be inclined relative to the body case 24 by being supported to the through hole 29*a* (the inner peripheral edge) of the recessed portion 29 of the body case 24 through the spherical seat 33. Both of the inclination mechanisms 41 are positioned in a direction vertical to each other as viewed from a center axis of the body case 24 on a plane vertical to the center axis thereof, and are configured of the same structure except for being in different positions. Therefore, hereinafter an explanation will be made of the configuration of one of the inclination mechanisms 41, and an explanation in regard to the other of the inclination mechanisms 41 will be omitted.

The inclination mechanism 41 has an inclining motor 42, an inclining screw 43, an inclining nut 44, and a tension spring 45. The inclining motor 42 is provided to be fixed to the body case 24, and, when driven, outputs rotation drive power through a rotary shaft portion 42*a*. The inclining motor 42 is provided with a drive gear 46 mounted to the rotary shaft portion 42, and is rotated as needed through an inclination drive unit 64 (refer to FIG. 4) under control of an emission-side control unit 61 to be described later. The inclining screw 43 is provided in the body case 24 in a direction in parallel to the center axis of the body case 24, and can rotate around its own center axis as a rotation center relative to the body case 24. An inclining gear 47 is fixed to the inclining screw 43. The inclining gear 47 is geared to the drive gear 46 that is provided in the rotary shaft portion 42*a* of the inclining motor 42.

The inclining nut 44 is provided to be geared to the inclining screw 43 while surrounding the inclining screw 43, thus preventing rotation of the inclining screw 43 to the body case 24 (the illustration is omitted). Therefore when the inclining screw 43 rotate around its own center axis as a rotation center, the inclining nut 44 transfers on the inclining screw 43 upward or downward depending upon the rotating direction. A nut-side pin 44*a* in a columnar shape is provided in the inclining nut 44 to project in a direction vertical to the axis.

The tension spring 45 is made of a spiral wire rod, and is contracted at the maximum in a non-load state, and exerts a flexible force against the movement for separating one end from the other end. The tension spring 45 is provided to bridge over between a spring receiving portion 29*b* provided in the recessed portion 29 of the body case 24 and a position of the emission unit housing 32 lower than the spherical seat 33 in an expanded state. The spring receiving portion 29*b* is provided in such a manner that a direction thereof as viewed from the center axis of the body case 24 is in accordance with a direction where the inclination mechanism 41 is provided, on a plane vertical to the center axis of the body case 24.

The emission unit housing 32, to which one end of the tension spring 45 is provided, is provided with a pair of inclination arms 48 (one thereof is not shown) that projects in a direction vertical to its own center axis (rotating axis Ar). The pair of inclination arms 48 are, to correspond to the inclination mechanisms 41 paired likewise, provided in such a manner that a projecting direction of each from the emission unit housing 32 as viewed from the center axis (rotating axis Ar) of the emission unit housing 32 is in accordance with a direction where the inclination mechanism 41 is provided, on a plane vertical to the center axis thereof. Each of the inclination arms 48 has a projecting end that is provided with an arm-side pin 48a. The arm-side pin 48a is formed in a columnar shape extending in a direction vertical to a nut-side pin 44a provided in the inclination nut 44, and can be in contact with the nut-side pin 44a, while sliding to each other to shift the contact position thereof. The arm-side pin 48a is positioned under the nut-side pin 44a of the inclination nut 44 in the corresponding inclination mechanism 41. Then, since the emission unit housing 32 is inclined to the body case 24 by being pulled by the tension spring 45 described above, the arm-side pin 48a of the inclination arm 48 tends to transfer upward. Therefore the arm-side pin 48a is pushed against the nut-side pin 44a regardless of a position thereof on the inclining screw 43 of the inclination nut 44.

With this configuration, in the inclination mechanism 41, when the inclining motor 42 is driven through the inclination drive unit 64 (refer to FIG. 4) under control of an emission-side control unit 61 to be described later, it is possible to rotate the inclining screw 43 through the drive gear 46 and the inclining gear 47, and it is possible to vertically transfer the inclination nut 44 in any position on the inclining screw 43 following the rotating amount and the rotating direction of the inclining crew 43. Then, a position of the inclination arm 48 changes through the arm-side pin 48a pushed against the nut-side pin 44a by the position of the inclination nut 44, and an inclination of the emission unit housing 32 to the body case 24 changes with the change of the position of the inclination arm 48. Therefore the inclination mechanism 41 can adjust the inclination of the emission unit housing 32 to the body case 24 under control of the emission-side control unit 61. The inclination mechanisms 41 are, as described above, provided to be paired in a direction vertical to each other. From this configuration, the pair of inclination mechanisms 41 can adjust the inclination and direction of the emission unit housing 32 to the body case 24 under control of the emission-side control unit 61.

The emission unit housing 32 is provided with paired level sensors 49 that can detect a horizontal state in one direction. The paired level sensors 49 are provided such that detectable directions are vertical to each other. When both of the paired level sensors 49 detect the horizontal state, the paired level sensors 49 are set to be positioned such that the center axis (rotating axis Ar) of the emission unit housing 32 is in a state in parallel to a vertical direction. The paired level sensors 49 output the detection signal to the emission-side control unit 61 to be described later (refer to FIG. 4). Therefore the emission-side control unit 61 drives the paired inclination mechanisms 41 through the inclination drive unit 64 (refer to FIG. 4) to be described later such that both thereof detect the horizontal state based upon detection signals from both of the level sensors 49, and thereby it is possible to always place the emission unit housing 32 (the center axis (rotating axis Ar)) to be in a state extending in a vertical direction (hereinafter, called also a vertical state of the laser emitting mechanism 31). In addition, the emission-side control unit 61 can also place the emission unit housing 32 (the center axis (rotating axis Ar)) to be in a state of being inclined in any direction and at any angle based upon detection signals from both of the level sensors 49.

The emission unit housing 32 is provided with the laser emitting mechanism 31. The laser emitting mechanism 31, as shown in FIG. 3, generates a measuring laser beam L that is emitted on an irradiation optical axis Ai, and has a laser beam emitting unit 51 and a collimator lens 52 within the emission unit housing 32, and a diffracting grating 53 and a pentaprism 54 within the rotary body 23.

The laser beam emitting unit 51 is connected to an optical source drive unit 62 to be described later, and is fixed to the emission unit housing 32 in such a manner as to make the center axis (rotating axis Ar) of the emission unit housing 32 the emission optical axis Ae. The laser beam emitting unit 51 is driven as needed by the optical source drive unit 62 under control of the emission-side control unit 61 to be described later (refer to FIG. 4) to emit a measuring laser beam L on the emission optical axis Ae. The drive control of the laser beam emitting unit 51 by the emission-side control unit 61 (optical source drive unit 62) will be explained later. The collimator lens 52 is provided on the emission optical axis Ae. The collimator lens 52 forms the measuring laser beam L that is emitted from the laser beam emitting unit 51 to be parallel light flux, and is provided to be fixed to the emission unit housing 32. The measuring laser beam L that is formed as the parallel light flux reaches into the rotary body 23 via the diameter reduction portion 34 (inside thereof).

The rotary body 23 can rotate around the rotating axis Ar as a rotation center relative to the emission unit housing 32. In the rotary body 23, the diffracting grating 53 is fixedly provided to the upper part of the diameter reduction portion 34, and the pentaprism 54 is provided to be fixed to the upper part of the diffracting grating 53. The diffracting grating 53 is provided to divide the measuring laser beam L that is emitted from the laser beam emitting unit 51 and is formed as the parallel light flux via the collimator lens 52 into three parts (refer to irradiation optical beams S1, S2 and S3). In addition, the diffracting grating 53, in a state where the measuring laser beam L is emitted on an irradiation optical axis Ai from an emission window 28 of the rotary body 23 as described later, forms the irradiation optical beam S1 and the irradiation optical beam S2 as optical beams in parallel to each other at predetermined intervals, and forms the irradiation optical beams 3 as an optical beam that is inclined to the irradiation optical beam S1 and the irradiation optical beam S2 between the irradiation optical beam S1 and the irradiation optical beam S2, as viewed on the plane vertical to the irradiation optical axis Ai. In the present embodiment, the irradiation optical beam S3 is provided as the optical beam extending obliquely in such a manner as to bridge over one upper end and the other lower end between the irradiation optical beam S1 and the irradiation optical beam S2. Therefore the diffracting grating 53 forms the measuring laser beam L that is emitted from the laser beam emitting unit 51 and is formed as the parallel light flux via the collimator lens 52 to the optical beam depicted in an N-letter shape by the irradiation optical beams S1, S2 and S3, as viewed on the plane vertical to the irradiation optical axis Ai. In the present embodiment, a binary optical element (BOE) is used as the diffracting grating 53. It should be noted that the diffracting grating 53, as described later, may be arranged in a position where the measuring laser beam L that is emitted from the laser beam emitting unit 51 and is formed as the parallel light flux via the collimator 52 changes in the advancing direction by the pentaprism 54 and thereafter, transmits therethrough.

The pentaprism 54 changes a direction where the measuring laser beam L (three irradiation optical beams S1, S2 and S3) that is divided into three parts by the diffracting grating 53 advances from a direction along the center axis (rotating axis Ar) of the emission unit housing 32 that is the emission direction from the laser beam emitting unit 51 to a direction vertical thereto. That is, the pentaprism 54 has a function of changing the advancing direction of the measuring laser beam L in the laser emitting mechanism 31 from the emission optical axis Ae that is the emission direction from the laser beam emitting unit 51 to the irradiation optical axis Ai vertical to the emission optical axis Ae. A position of the pentaprism 54 in the rotary body 23 is set in such a manner as to position the emission window 28 of the rotary body 23 on the irradiation optical axis Ai.

Therefore, in the laser emitting mechanism 31, the diffracting grating 53 and the pentaprism 54 have a function of emitting the measuring laser beam L that is emitted from the laser beam emitting unit 51 and advances on the emission optical axis Ae via the collimator 52 as the three irradiation optical beams S1, S2 and S3 advancing on the irradiation optical axis Ai from the emission window 28 of the rotary body 23. Therefore, the pentaprism 54 (emission window 28) in the rotary body 23 of the laser emitting mechanism 31 functions as an emission unit in the rotary laser emitting apparatus 11. The three irradiation optical beams S1, S2 and S3 each have a divergent fan-shape spreading as is away from the emission optical axis Ae by the diffracting grating 53 and the pentaprism 54, and are made to light flux (so-called fan beam) having a spreading angle equal to each other (refer to FIG. 1 and the like). In addition, the three irradiation optical beams S1, S2 and S3 each spread as is away from the emission optical axis Ae by being formed as the fan beam, but have no change in the N-letter shape depicted on the plane vertical to the irradiation optical axis Ai regardless of a change in distance from the emission optical axis Ae. In other words, in the three irradiation optical beams S1, S2 and S3, the N-letter shape depicted on the plane vertical to the irradiation optical axis Ai has a similarity shape differing in magnitude dimension depending on a change in distance from the emission optical axis Ae. Since the diffracting grating 53 and the pentaprism 54 are fixed to the rotary body 23 in the rotary laser emitting apparatus 11, the irradiation optical axis Ai can be rotated at a constant speed to the body case 24 by driving and rotating the rotary body 23 at a constant speed to the emission unit housing 32 under control of the emission-side control unit 61 to be described later (refer to FIG. 4). Therefore in the rotary laser emitting apparatus 11, it is possible to rotate and emit the three irradiation optical beams S1, S2 and S3 as the measuring laser light beam L. From this, in the three irradiation optical beams S1, S2 and S3, a time interval of each is made to be equal at the time of transmission by rotation regardless of a difference in distance from the rotary laser emitting apparatus 11 (emission optical axis Ae).

Figure 4:
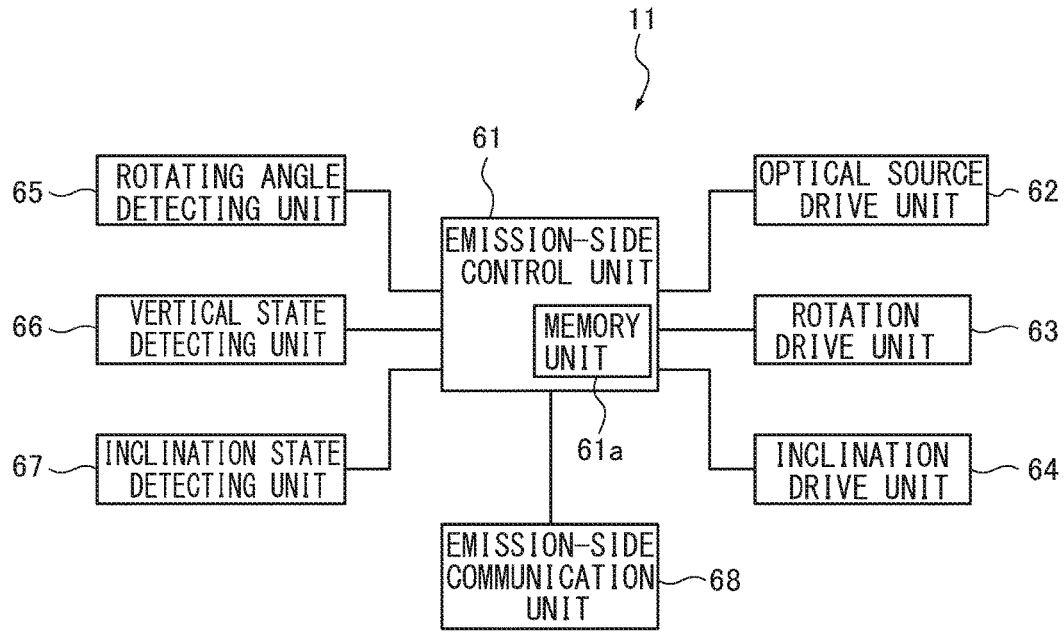
FIG. 4 is an explanatory diagram showing the configuration of the rotary laser emitting apparatus by function blocks.

The rotary laser emitting apparatus 11, as shown in FIG. 4, has the emission-side control unit 61, the optical source drive unit 62, the rotation drive unit 63, the inclination drive unit 64, the rotating angle detecting unit 65, the vertical state detecting unit 66 and the inclination state detecting unit 67, and the emission-side communication unit 68. The emission-side control unit 61 can obtain detection signals from the rotating angle detecting unit 65, the vertical state detecting unit 66 and the inclination state detecting unit 67 or an operational signal in response to an operation performed by an operational unit not illustrated. The emission-side control unit 61 integrally controls a drive of the rotary laser emitting apparatus 11, that is, drives of the optical source drive unit 62, the rotation drive unit 63, the inclination drive unit 64, and the emission-side communication unit 68 by programs stored in a memory unit 61a. Specifically the emission-side control unit 61, based upon detection contents from the rotating angle detecting unit 65, the vertical state detecting unit 66 and the inclination state detecting unit 67 or the operation performed to the operational unit (not shown), executes drive processing that rotates and emits the measuring laser beam L (three irradiation optical beams S1, S2 and S3), posture control processing (for example, placing the laser emitting mechanism 31 to be in a vertical state) of the emission unit housing 32, information superimposing processing that superimposes communication information to the measuring laser beam L, communication processing of the laser receiving apparatus 12 with a light receiving-side control unit 73 which will be described later (refer to FIG. 5) using the emission-side communication unit 68, and the like. Electrical power is supplied to the optical source drive unit 62, the rotation drive unit 63, the inclination drive unit 64, the rotating angle detecting unit 65, the vertical state detecting unit 66, the inclination state detecting unit 67, and the emission-side communication unit 68 from a power source (not shown) through the emission-side control unit 61 to enable execution of the respective operations. The emission-side control unit 61 is configured by mounting a plurality of electronic components such as a capacitor and a resistance on a main substrate (not shown), and the main substrate is provided to be fixed to the body case 24 on an inner side thereof (refer to FIG. 2).

The optical source drive unit 62 drives the laser beam emitting unit 51 (refer to FIG. 3) under control of the emission-side control unit 61, thereby causing the measuring laser beam L to be emitted from laser beam emitting unit 51. Then the optical source drive unit 62 superimposes communication information on the measuring laser beam L under control of the emission-side control unit 61 for emission, which will be explained later.

The rotation drive unit 63 drives the scan motor 37 (refer to FIG. 2) that is provided in the emission unit housing 32 under control of the emission-side control unit 61. That is, the rotation drive unit 63 drives the scan motor 37 under control of the emission-side control unit 61, thereby driving and rotating the rotary body 23 relative to the emission unit hosing 32 through the drive gear 38 mounted on the rotary shaft portion 37a and the scan gear 36 geared thereto (refer to FIG. 2). Therefore the rotation drive unit 63 drives and rotates the irradiation optical axis Ai relative to the emission unit housing 32, that is, the body case 24 in the laser emitting apparatus 31.

The inclination drive unit 64 drives each inclining motor 42 (refer to FIG. 2) of the pair of inclination mechanisms 41 that are provided in the body case 24 under control of the emission-side control unit 61. That is, the inclination drive unit 64 drives each inclining motor 42 under control of the emission-side control unit 61, thereby making it possible to adjust the inclination and direction of the emission unit housing 32, that is, the laser emitting mechanism 31 to the body case 24 (refer to FIG. 2).

Figure 7:
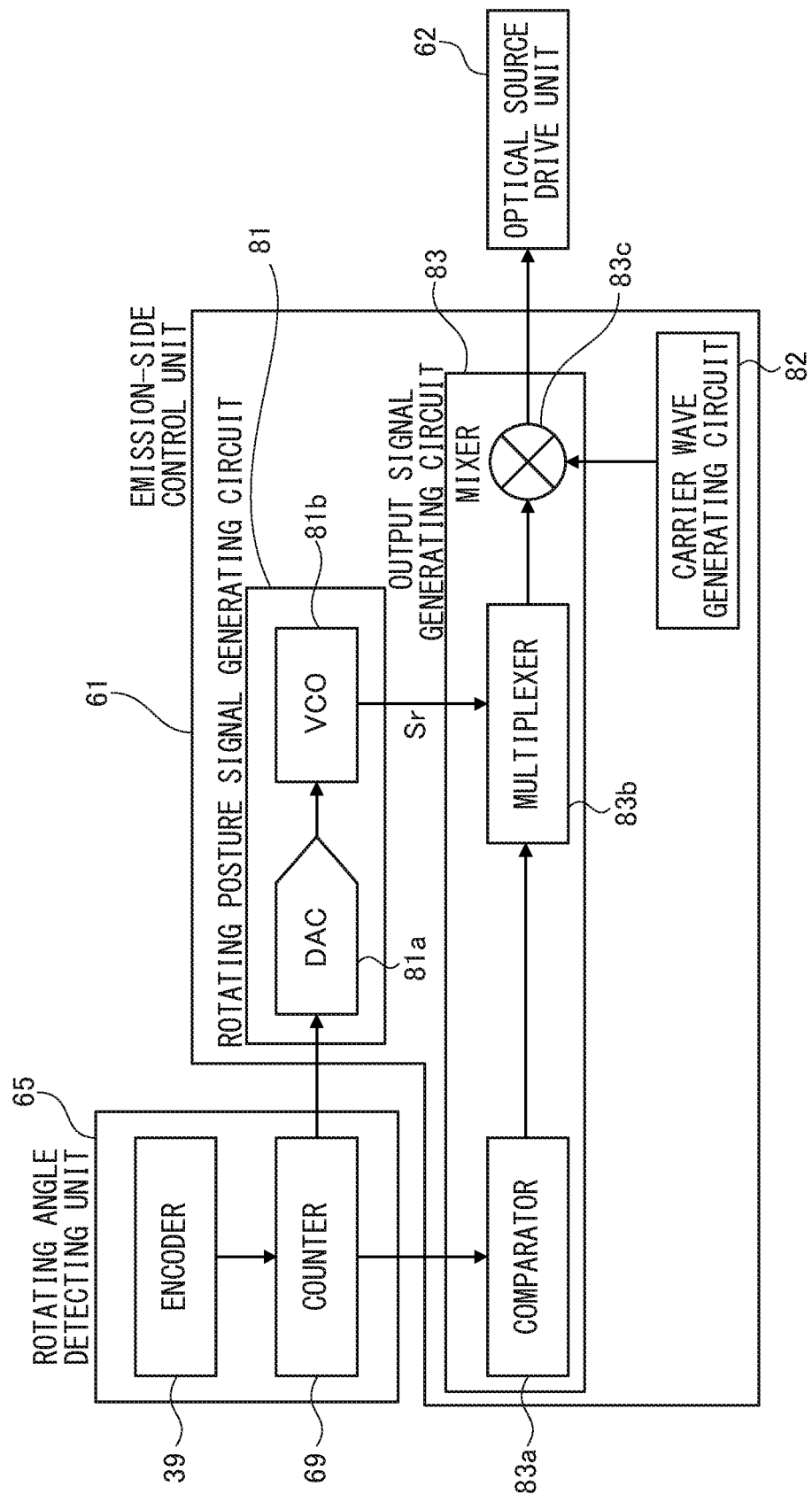
FIG. 7 is an explanatory diagram showing the configuration of an emission-side control unit and the configuration of a rotating angle detecting unit of the rotary laser emitting apparatus by function blocks.
Figure 8:
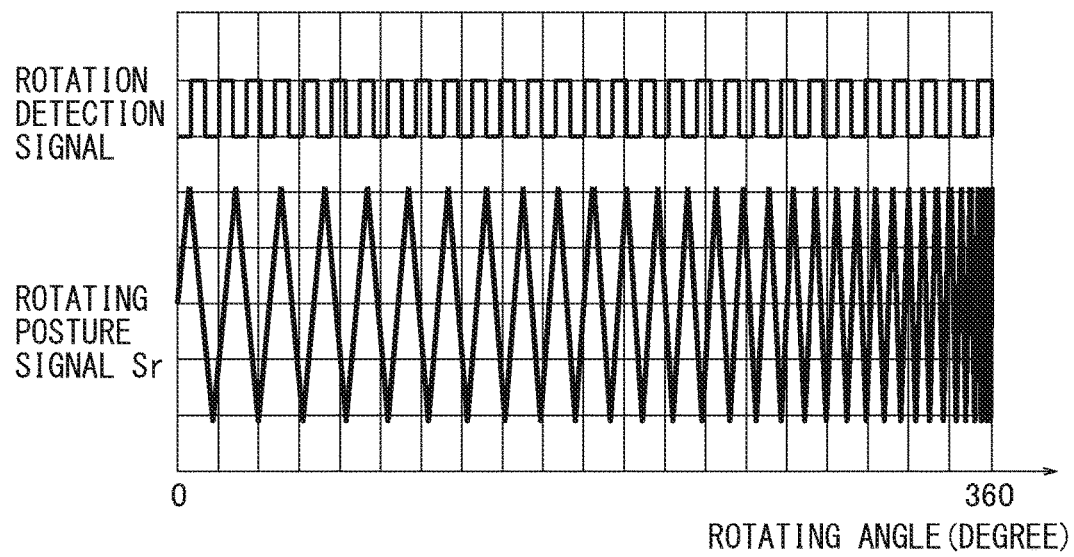
FIG. 8 is a graph showing an example of a rotation detection signal that is output by an encoder of the rotating angle detecting unit and a rotating posture signal that is output by a rotating posture signal generating circuit of the emission-side control unit, wherein a horizontal axis thereof is indicated at a rotating angle (degree) from a reference position of a rotary body (irradiation optical axis).

The rotating angle detecting unit 65 detects a rotating posture (rotating angle) of the rotary body 23 relative to the emission unit housing 32, and in the present embodiment, is configured of the encoder 39 (refer to FIG. 2) and a counter (refer to FIG. 7). The rotating posture shows which direction the irradiation optical axis Ai (refer to FIG. 3) that is the irradiation direction of the measuring laser beam L (three irradiation optical beams S1, S2 and S3) from the rotary body 23 is oriented in to a reference position in the emission unit housing 32, as viewed in the rotating direction around the center axis (rotating axis Ar) of the emission unit housing 32 as the rotation center. In other words, the rotating posture can be shown by a rotating angle between the irradiation optical axis Ai and the reference position as viewed in the above rotating direction, and shows a direction where the measuring laser beam L (three irradiation optical beams S1, S2 and S3) is emitted (direction where the irradiation optical axis Ai is directed) to the emission unit housing 32, that is, the body case 24 as viewed in the above rotating direction. The encoder 39, as described above, outputs rotation detection signals repeating high-low waveforms (refer to the upper waveform in FIG. 8) with rotation of the rotary body 23 to the emission unit housing 32 to the counter 69 (refer to FIG. 7). The counter 69 counts the number of high-low waveforms in the rotation detection signal from the encoder 39 on a basis of the reference position of the rotating posture of the rotary body 23 to the emission unit housing 32, and outputs the count signal to the emission-side control unit 61 (refer to FIG. 7). The emission-side control unit 61 can determine a rotating posture (rotating angle between the irradiation optical axis Ai and the reference position) of the rotary body 23 to the emission unit housing 32 from the reference position, from the count signal of the encoder 39. Therefore the rotating angle detecting unit 65 functions as a rotating direction detecting unit.

The vertical state detecting unit 66 detects a posture of the emission unit housing 32 (laser emitting mechanism 31) to the vertical direction, and in the present embodiment, is configured of a pair of level sensors 49 (refer to FIG. 2). The pair of level sensors 49 each, as described above, can detect a horizontal state in one direction, and, when both thereof detect the horizontal state, are set such that the emission unit housing 32 (the center axis (rotating axis Ar of the laser emitting mechanism 31)) has a posture of extending in the vertical direction. Therefore the emission-side control unit 61 can always position the emission unit housing to the posture of extending in the vertical direction (position the laser emitting mechanism 31 to be in the vertical state) by setting a state where both of the level sensors 49 as the vertical state detecting unit 66 detect the horizontal state, and when the respective level sensors 49 as the vertical state detecting unit 66 each are in a state of detecting a targeted value, the emission unit housing 32 can have a posture positioned in any direction and inclined with any angle to the vertical direction.

The inclination state detecting unit 67 detects an inclination of the emission unit housing 32 (laser emitting mechanism 31) to the body case 24. The inclination state detecting unit 67 is configured, although not shown, of a mechanism (for example, combination of a light emitting unit and a light receiving unit) that is provided between the body case 24 and the emission unit housing 32 to detect a change in a relative position relation therebetween. It should be noted that the inclination state detecting unit 67 may have the other configuration only if it can detect the inclination of the emission unit housing 32 to the body case 24, and is not limited to the configuration in the present embodiment. The other configuration may include an example where a pair of level sensors are provided for detecting an inclination and a direction of the body case 24 to the vertical direction, and the inclination of the emission unit housing 32 to the body case 24 is figured out from detection signals therefrom and detection signals from the pair of level sensors 49.

The emission-side communication unit 68 can make exchange of information (data) between the emission-side control unit 61 and a light receiving-side control unit 73 (refer to FIG. 5), which will be described later, of the laser receiving apparatus 12 through a light receiving-side control unit 80 (refer to FIG. 5), which will be described later, of the laser receiving apparatus 12. In the present embodiment, The emission-side communication unit 68 sends information of the inclination of the emission unit housing 32 (laser emitting mechanism 31) detected in the inclination state detecting unit 67 to the body case 24 and position information of the known point X where the rotary laser emitting apparatus 11 is provided, from the emission-side control unit 61 to the light receiving-side control unit 73.

With this configuration, in the rotary laser emitting apparatus 11, the emission-side control unit 61 rotates and emits three irradiation optical beams S1, S2 and S3 as the measuring laser beam L by driving and rotating the rotary body 23 (irradiation optical axis Ai) to the emission unit housing 32 by the rotation drive unit 63, and driving the laser beam emitting unit 51 by the optical source drive unit 62. At the rotation and irradiation time, a plane that is formed the irradiation optical axis Ai (rotary body 23) rotated around the center axis (rotating axis Ar) of the emission unit housing 32 as the rotation center is defined as a reference plane Pb (refer to FIG. 6A to FIG. 6D) formed by the rotary laser emitting apparatus 11. That is, the reference plane Pb is made to be in parallel to a plane vertical to the rotating axis Ar of the laser emitting apparatus 31 (emission unit housing 32) that rotates and emits the measuring laser beam L (three irradiation optical beams S1, S2 and S3). In the rotary laser emitting apparatus 11, at the rotation and irradiation time, the emission-side control unit 61 adjusts the inclination and direction of the emission unit housing 32 (laser emitting mechanism 31) by the inclination drive unit 64 in such a manner that both of the level sensors 49 as the vertical state detecting unit 66 always detect the horizontal state, thus making it possible to always position the laser emitting mechanism 31 to be in a vertical state to rotate and emit the three irradiation optical beams S1, S2 and S3 as the measuring laser beam L adjusting the reference plane Pb to the horizontal plane. Therefore even if the body case 24 is inclined at the time of installing the rotary laser emitting apparatus 11 in the known point X by the tripod stand 13, the laser emitting mechanism 31 can be made to be always in the vertical state, and it is possible to rotate and emit the three irradiation optical beams S1, S2 and S3 (measuring laser beam L) adjusting the reference plane Pb to the horizontal plane. In addition, in the rotary laser emitting apparatus 11, the emission-side control unit 61 adjusts the inclination and direction of the emission unit housing 32 (laser emitting mechanism 31) to the body case 24 by the inclination drive unit 64 in such a manner that each of the level sensors 49 as the vertical state detecting unit 66 always detects a target value, thus making it possible for the laser emitting mechanism 31 (emission unit housing 32) to always have a posture of any direction and inclined with any angle to rotate and emit the three irradiation optical beams S1, S2 and S3 as the measuring laser beam L inclining the reference plane Pb to the horizontal plane in any direction and with any angle.

In the laser measurement system 10, for performing the measurement using the three irradiation optical beams S1, S2 and S3 as the measuring laser beam L emitted from the rotary laser emitting apparatus 11 as described above, the laser receiving apparatus 12 is installed in a location to be measured to receive the irradiation optical beams S1, S2 and S3 (refer to FIG. 1A and FIG. 1B). The laser receiving apparatus 12 is, as shown in FIG. 1A, supported by a certain support means to be installed in the location to be measured. The laser receiving apparatus 12 uses a rod 14 that can be held by hands of an operator as the certain support means in the example shown in FIG. 1A and FIG. 1B. That is, the laser receiving apparatus 12 is mounted in a certain height position in the rod 14, and a lower end of the rod 14 held by hands of an operator is directed to a location to be measured to uprear the rod 14, thus installing the laser receiving apparatus 12 to be positioned in the location to be measured. The rod 14 is provided with a GPS position measuring apparatus 15 at the upper end in the example shown in FIG. 1A and FIG. 1B. The GPS position measuring apparatus 15 is a receiving terminal that can receive a radio wave signal from a GPS satellite (not shown) for positioning using GPS (global positioning system). It should be noted that the certain support means that supports the laser receiving apparatus 12 may be a work tool (for example, a blade of a bulldozer) of a construction machine, or a tool fixed on a wall surface or the like, and is not limited to the present embodiment.

Figure 5:
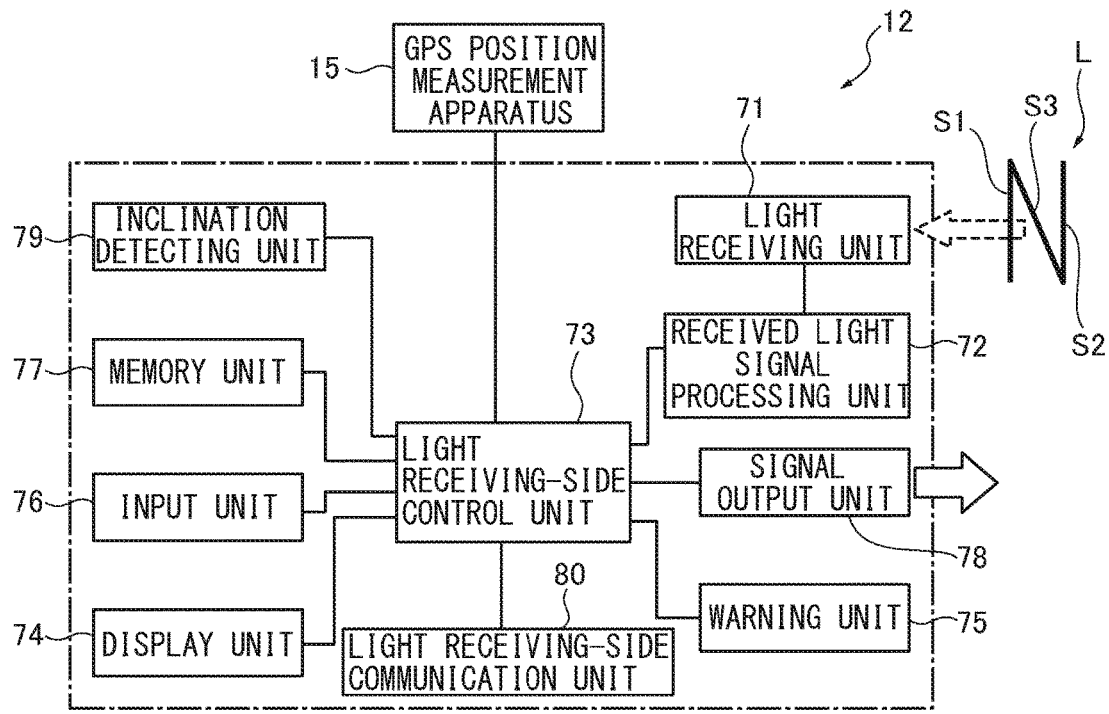
FIG. 5 is an explanatory diagram showing the configuration of a laser receiving apparatus by function blocks.

The laser receiving apparatus 12, as shown in FIG. 5, includes a light receiving unit 71, a received light signal processing unit 72, a light receiving-side control unit 73, a display unit 74, a warning unit 75, an input unit 76, a memory unit 77, a signal output unit 78, an inclination detecting unit 79, and a light receiving-side communication unit 80.

The light receiving unit 71 receives three irradiation optical beams S1, S2 and S3 as the measuring laser beam L that is emitted from the rotary laser emitting apparatus 11. The light receiving unit 71 has, for example, a non-spherical lens having directional characteristics of ±10 degrees and an Si photodiode, and when the light having passing through the non-spherical lens is incident to a light receiving surface of the Si photodiode, the light receiving unit 71 outputs a received light signal (refer to FIG. 10A) that is an analogue value of intensity in accordance with a light volume of light received on the light receiving surface. The light receiving unit 71 is connected to the received light signal processing unit 72, and the received light signal that is output is transmitted to the received light signal processing unit 72.

The received light signal processing unit 72 executes processing of received light signals of the irradiation optical beams S1, S2 and S3 (measuring laser beam L) that are input from the light receiving unit 71 and calculates a high-low difference H between the reference plane Pb formed by the rotary laser emitting apparatus 11 and the received position (light receiving unit 71) from the received light signal, and executes optical beam state detecting processing that extracts a rotating posture of the rotary body 23 to the emission unit hosing 32 at the time the received irradiation optical beams S1, S2 and S3 are emitted, from communication information (rotating posture signal Sr to be described later (refer to FIG. 7) or the like) superimposed in the irradiation optical beams S1, S2 and S3. These processing will be explained later. The received light signal processing unit 72 is connected to the light receiving-side control unit 73, and outputs the calculated information (detected optical beam state) to the light receiving-side control unit 73.

The light receiving-side control unit 73 can obtain the information calculated (extracted) by the received light signal processing unit 72, the operating signal in response to the operation performed by the input unit 76, the inclination detection signal that is output from the inclination detecting unit 79, and the information that is input via the light receiving-side communication unit 80. The light receiving-side control unit 73 controls a drive of the laser receiving apparatus 12, that is, executes calculation processing for measurement based upon the irradiation optical beams S1, S2 and S3, and integrally controls drives of the display unit 74, the warning unit 75, the signal output unit 78, the inclination detecting unit 79, and the light receiving-side communication unit 80, based upon programs stored in the memory unit 77 or in an incorporated memory unit (not shown). Specifically the light receiving-side control unit 73 executes treatment determination processing of the irradiation optical beams S1, S2 and S3 received in the light receiving unit 71 based upon information obtained from the received light signal processing unit 72 and the light receiving-side communication unit 80, and position information calculation processing of a location to be measured, where the laser receiving apparatus 12 is installed based upon the irradiation optical beams S1, S2 and S3 based upon the irradiation optical beams S1, S2 and S3. In addition, the light receiving-side control unit 73 executes display control processing in the display unit 74, operation processing for warning in the warning unit 75, output information generation processing in the signal output unit 78 and the like, based upon detection contents from the inclination detecting unit 79 or the operation performed in the input unit 76. Power is supplied to the light receiving unit 71, the received light signal processing unit 72, the display unit 74, the warning unit 75, the input unit 76, the memory unit 77, the signal output unit 78, the inclination detecting unit 79, and the light receiving-side communication unit 80 through the light receiving-side control unit 73 from a power source (not shown), thus making it possible to execute the respective operations. The light receiving-side control unit 73 is configured with the mounting of a plurality of electronic components such as capacitors and resistances on the main substrate, which are not illustrated, and the main substrate is provided to be fixed to the housing of the laser receiving apparatus 12 at the inside.

The display unit 74 displays various kinds of information under control of the light receiving-side control unit 73. The various kinds of information may include, for example, information of an absolute position detected by the GPS position measuring apparatus 15 provided in the rod 14 supporting the laser receiving apparatus 12, information of a position of the laser receiving apparatus 12 calculated based upon detection of the GPS position measuring apparatus 15, height information of the laser receiving apparatus 12, information (refer to FIG. 6A to FIG. 6D) of a high-low angle θv of the light receiving unit 71 in the laser receiving apparatus 12 to the reference plane Pb as viewed from the emission unit (pentaprism 54) of the laser emitting mechanism 31 that is the location in the rotary laser emitting apparatus 11 where the measuring laser beam L is emitted, inclination information of the rod 14 (laser receiving apparatus 12) detected by the inclination detecting unit 79, and the like.

The warning unit 75 warns that the three irradiation optical beams S1, S2 and S3 (measuring laser beam L) that are emitted from the rotary laser emitting apparatus 11 cannot be received in the light receiving unit 71 under control of the light receiving-side control unit 73 under control of the light receiving-side control unit 73 under control of the light receiving-side control unit 73. In the present embodiment, the warning unit 75 honks a buzzer to draw operator's attention in a case where the three irradiation optical beams S1, S2 and S3 (measuring laser beam L) cannot be received in the light receiving unit 71, that is, the light receiving unit 71 is out of a rotation irradiation range of the three irradiation optical beams S1, S2 and S3 (measuring laser beam L).

The input unit 76 enables input of information by an operator's operation, and is configured of various kinds of switches for performing or setting an operation of the laser receiving apparatus 12 by the operator's operation. It should be noted that the display unit 74 is configured to have a touch panel function, and thereby the display unit 74 may be used as the input unit 76.

The memory portion 77 rewrites (stores) various kinds of information therein as needed under control of the light receiving-side control unit 73, and the stored various pieces of information are read out (obtained) therefrom. The various kinds of information may include, for example, information for calculating a high-low angle θv to the reference plane Pb from the received light signal processing unit 72 (refer to FIG. 6A to FIG. 6D), communication information (rotating posture signal Sr to be described later (refer to FIG. 7 and the like)) that is superimposed on the irradiation optical beams S1, S2 and S3 from the received light signal processing unit 72, information of an absolute position detected by the GPS position measuring apparatus 15 provided in the rod 14 supporting the laser receiving apparatus 12, information of a position of the laser receiving apparatus 12 calculated based upon detection of the GPS position measuring apparatus 15, height information of the laser receiving apparatus 12 with the laser receiving apparatus 12 being supported by the rod 14, information (refer to FIG. 6A to FIG. 6D) of a high-low angle θv of the light receiving unit 71 of the laser receiving apparatus 12 to the reference plane Pb as viewed from the emission unit (pentaprism 54) of the laser emitting mechanism 31 that is the location where the measuring laser beam L in the rotary laser emitting apparatus 11 is emitted, inclination information of the rod 14 (laser receiving apparatus 12) detected by the inclination detecting unit 79, and the like.

The signal output unit 78 outputs a signal obtained in the light receiving-side control unit 73 and measurement information obtained as a calculation result by the light receiving-side control unit 73. The output from the signal output unit 78, although not shown, is used for obtaining or displaying the measurement information in an external device or for controlling a construction machine or the like through the external device.

The inclination detecting unit 79 detects an inclination of the laser receiving apparatus 12 itself, that is, an inclination angle of the rod 14 supporting the laser receiving apparatus 12. The inclination detecting unit 79 is connected to the light receiving-side control unit 73, and outputs an inclination angle signal showing the detected inclination angle of the rod 14 to the light receiving-side control unit 73.

The light receiving-side communication unit 80 can make exchange of information (data) between the emission-side control unit 61 in the rotary laser emitting apparatus 11 (refer to FIG. 4) and a light receiving-side control unit 73 through the emission-side control unit 61 in the rotary laser emitting apparatus 11 (refer to FIG. 4). In the present embodiment, the light receiving-side communication unit 80 receives information of the inclination of the emission unit housing 32 (laser emitting mechanism 31) detected in the inclination state detecting unit 67 in the rotary laser emitting apparatus 11 to the body case 24 and position information of the known point X where the rotary laser emitting apparatus 11 is provided, from the emission-side control unit 61 through the light receiving-side control unit 73.

Next an explanation will be made of a state of executing the measurement using the laser measurement system 10. First, an operator, as shown in FIG. 1A, installs the rotary laser emitting apparatus 11 in the known point X through the tripod stand 13. The operator is assumed to set the reference plane Pb (refer to FIGS. 6A to 6D or the like) to be in parallel to the horizontal plane in the rotary laser emitting apparatus 11. Then, in the rotary laser emitting apparatus 11, each inclination mechanism 41 is driven such that both of the pair of level sensors 49 detect the horizontal state under control of the emission-side control unit 61 (refer to FIG. 4), adjusting the laser emitting apparatus 31 to be in a vertical state (refer to FIG. 2). Therefore the rotary laser emitting mechanism 11 rotates and emits the three irradiation optical beams S1, S2 and S3 (measuring laser beam L) along the reference plane Pb in parallel to the horizontal plane.

An operator directs a lower end of the rod 14 supporting the laser receiving apparatus 12 to a location to be measured (target position) to uprear the rod 14. Since the laser receiving apparatus 12 is mounted in the rod 14 in a certain height position, the laser receiving apparatus 12 results in being positioned in the known height position from the land surface (location to be measured). The operator causes the light receiving unit 71 of the laser receiving apparatus 12 to receive the measuring laser beam L (three irradiation optical beams S1, S2 and S3) that is emitted from the rotary laser emitting apparatus 11. Here, since the measuring laser beam L is configured of three irradiation optical beams S1, S2 and S3 formed as fan beams, the light receiving unit 71 can receive light even if it is made of a dot-like light receiving element. Therefore it is not necessary to accurately perform positioning of the laser receiving apparatus 12 (the light receiving unit 17). In the light receiving-side control unit in the laser receiving apparatus 12, the light receiving-side communication unit 80 obtains the position information of the known point X where the rotary laser emitting apparatus 11 is installed from the emission-side control unit in the rotary laser emitting apparatus 11 through the emission-side communication unit 68 in the rotary laser emitting apparatus 11, the position information being stored in the memory portion 77. It should be noted that obtaining the information of the known point X in the light receiving-side control unit 73 may be input using the input unit 76 (refer to FIG. 5) in the laser receiving apparatus 12 by an operator. In the laser receiving apparatus 12 (the light receiving-side control unit 73 therein), information of an absolute position of the rod 14 in the horizontal direction is obtained and information of an absolute position of the rod 14 including an absolute height of the GPS position measuring apparatus 15 is obtained, from the positioning information by the GPS position measuring apparatus 15. However, since it is difficult to ensure accuracy in height information with the positioning information by the GPS position measuring apparatus 15, the measurement is performed by using the rotary laser emitting apparatus 11 installed in the known point X and the laser receiving apparatus 12 installed in the location to be measured (target position).

Here, since a position relation between the GPS position measuring apparatus 15 and the laser receiving apparatus 12 is known, it is possible to find the horizontal position of the laser receiving apparatus 12 based upon the position relation and the positioning information of the GPS position measuring apparatus 15. A height of the laser receiving apparatus 12 can be found by calculating a height position of the light receiving unit 71 to the reference plane Pb of the rotary laser emitting apparatus 11 based upon the three irradiation optical beams S1, S2 and S3 (measuring laser beams L). The height position of the light receiving unit 71, for example, can be calculated as follows.

Figure 6A:
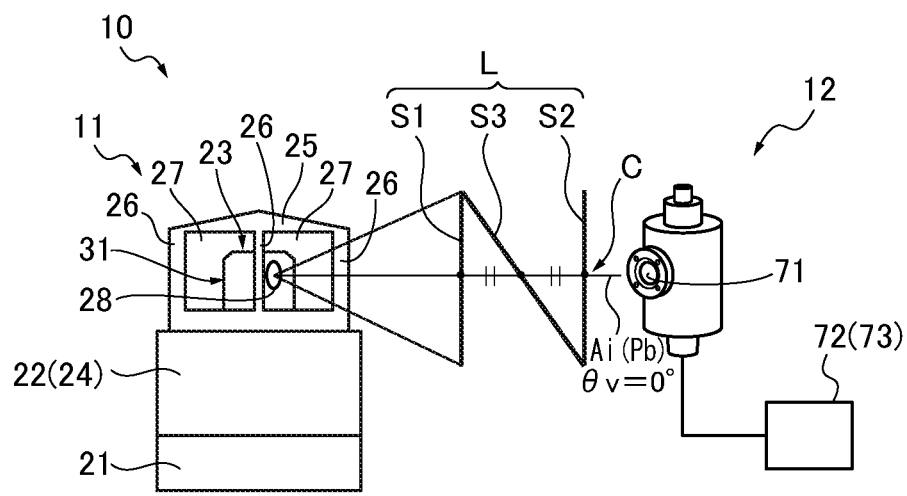
Figure 6B:
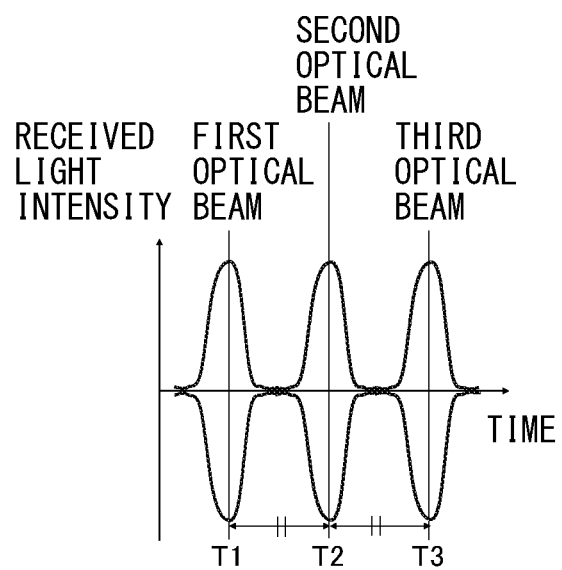

As shown in FIG. 6A, in a case where the center position of the light receiving unit 71 in the laser receiving apparatus 12 is in complete agreement with the emission position (irradiation optical axis Ai (reference plane Pb)) of the rotary laser emitting apparatus 11 (high-low angle θv=zero degrees) as viewed in the height direction (vertical direction), the laser receiving apparatus 12 receives light in a center position C of the three irradiation optical beams S1, S2 and S3 (the measuring laser beam L) as viewed in the height direction. The high-low angle θv is an angle of the light receiving unit 71 (the center position) of the laser receiving apparatus 12 to the reference plane Pb (irradiation optical axis Ai) as viewed from an emission position of the laser emitting mechanism 31 (the emission unit (pentaprism 54) of the laser emitting mechanism 31). Then, received light signals in accordance with the irradiation optical beam S1, the irradiation optical beam S3 and the irradiation optical beam S2 are, as shown in FIG. 6B, output from the laser receiving apparatus 12 at equal time intervals.

Figure 6C:
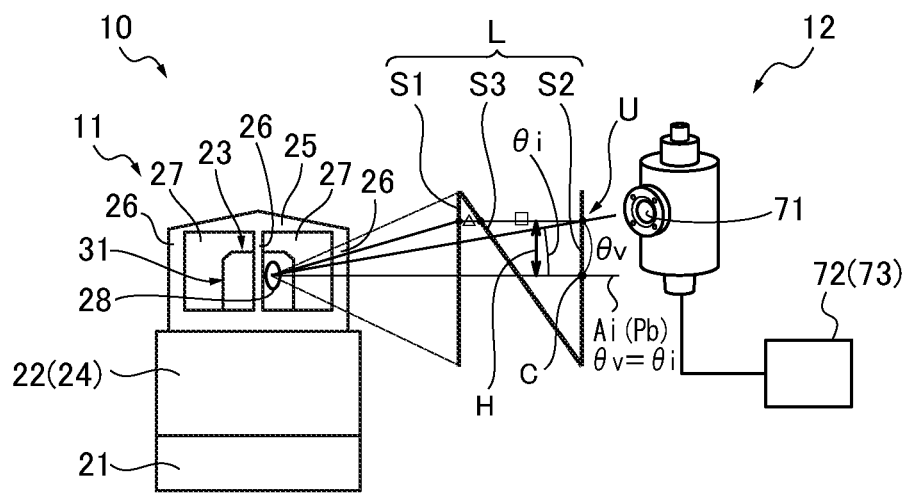
Figure 6D:
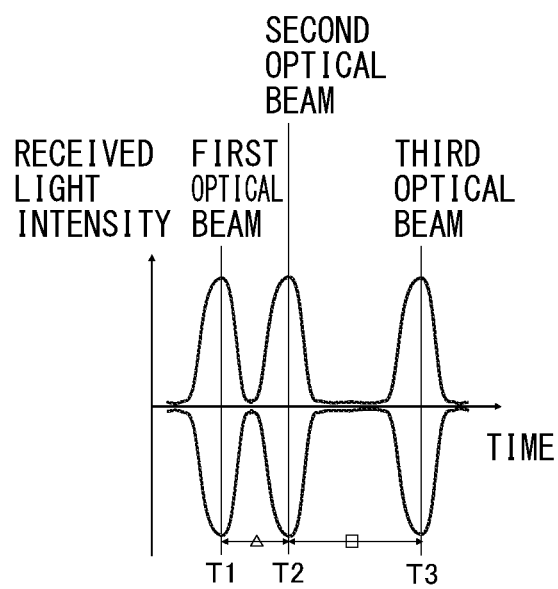

On the other hand, as shown in FIG. 6C, in a case where the center position of the light receiving unit 71 in the laser receiving apparatus 12 is positioned to be higher by an angle of θi (high-low angle θv=θi) as viewed in the emission angle than the emission position (irradiation optical axis Ai (reference plane Pb)) of the rotary laser emitting apparatus 11, the laser receiving apparatus 12 receives the measuring laser beam L in a position U higher by the angle of θi as viewed in the height direction. Then, received light signals in accordance with the irradiation optical beam S1, the irradiation optical beam S3 and the irradiation optical beam S2 are, as shown in FIG. 6D, output from the laser receiving apparatus 12 in time differences in accordance with intervals in the higher position U.

Here, the three irradiation optical beams S1, S2 and S3 are formed as optical beams depicted in an N-letter shape as viewed in a plane vertical to the irradiation optical axis Ai. Therefore in a case where the center position of the light receiving unit 71 in the laser receiving apparatus 12 is in a position lower than the emission position (irradiation optical axis Ai (reference plane Pb)) of the rotary laser emitting apparatus 11, a generation way of time difference between received light signals in accordance with the three irradiation optical beam S1, the irradiation optical beam S3 and the irradiation optical beam S2 is reversed. In addition, since in the three irradiation beams S1, S2 and S3, the N-letter shape depicted on the plane vertical to the irradiation optical axis Ai has a similarity shape differing in magnitude dimension depending on a change in interval from the emission optical axis beam Ae, a relationship of the above-mentioned time difference to the high-low angle θv (emission angle θi) is constant regardless of a change in interval from the emission optical axis Ae. Therefore in the laser receiving apparatus 12, a high-low angle θv in a light receiving position (center position in the light receiving unit 71) as viewed from the emission position of the rotary laser emitting apparatus 11 can be accurately calculated by accurately measuring time intervals of received light signals of the three irradiation optical beams S1, S2 and S3. In the laser receiving apparatus 12, the high-low angle θv is calculated by a high-low angle detecting circuit 92 (refer to FIG. 9), which will be described later, in the received light signal processing unit 72 under control of the light receiving-side control unit 73.

In the laser receiving apparatus 12 (light receiving-side control unit 73), a distance and directionality between the known point X (rotary laser emitting apparatus 11) and the laser receiving apparatus 12 (the installment location) can be found based upon the position information of the known point X (rotary laser emitting apparatus 11) stored in the memory unit 77 and the horizontal position information of the laser receiving apparatus 12 obtained from the measurement result of the GPS position measuring apparatus 15. It should be noted that in a case where the rod 14 erected by an operator is inclined, the distance between the known point X (rotary laser emitting apparatus 11) and the laser receiving apparatus (the installment location) is corrected based upon an inclination angle of the rod 14 detected by the inclination detecting unit 79 (refer to FIG. 5). In addition, in the laser receiving apparatus 12 (light receiving-side control unit 73), the high-low angle detecting circuit 92, as described above, accurately measures the time intervals of the received light signals that are output from the light-receiving unit 71, thereby accurately calculating the high-low angle θv of the laser receiving apparatus 12 (the light receiving unit 71) to the rotary laser emitting apparatus 11 installed in the known point X. In addition, in the present embodiment, the three irradiation optical beams S1, S2 and S3 (measuring laser beam L) are rotated and emitted along the reference plane Pb in parallel to the horizontal plane from the rotary laser emitting apparatus 11.

Therefore in the laser receiving apparatus 12 (light receiving-side control unit 73), a high-low difference H of the laser receiving apparatus 12 of the light receiving unit 71 to the reference plane Pb can be calculated based upon the calculated high-low angle θv, and the distance and directionality between the rotary laser emitting apparatus 11 (the emission unit (pentaprism 54) of the laser emitting mechanism 31) and the laser receiving apparatus 12 (light receiving unit 71). Thereby, in the laser measurement system 10, the high-low difference H of the laser receiving apparatus 12 to the rotary laser emitting apparatus 11 can be measured without elevating the laser receiving apparatus 12. In addition, in the laser measurement system 10, a measurement value including the height position of a location to be measured (target position) is calculated based upon the positioning information of the known point X (rotary laser emitting apparatus 11), the distance and directionality between the known point X (rotary laser emitting apparatus 11) and the laser receiving apparatus 12 (the installment location), the above-mentioned high-low difference H, and the position relation of the known point X and the emission position of the rotary laser emitting apparatus 11. As a result, in the laser measurement system 10, the measurement of the location to be measured (target position) can be performed based upon the positioning information by the GPS position measuring apparatus 15 and the three irradiation optical beams S1, S2 and S3.

Next, an explanation will be made of the featuring configuration of each of the laser measurement system 10 and the rotary laser emitting apparatus 11 according to the present invention. In the laser measurement system 10, the rotary laser emitting apparatus 11 executes information superimposing processing of superimposing information of the rotating posture of the rotary body 23 to the emission unit housing 32 on the rotating and emitting measuring laser beam L (three irradiation optical beams S1, S2 and S3), as communication information. In addition, in the laser measurement system 10, the laser receiving apparatus 12 executes optical beam state detecting processing for detecting an optical beam state of the measuring laser beam L (three irradiation optical beams S1, S2 and S3) received in the light receiving unit 71, and treatment determination processing of the measuring laser beam L received in the light receiving unit 71 based upon the detected optical beam state.

First, an explanation will be made of the information superimposing processing in the emission-side control unit 61 of the rotary laser emitting apparatus 11. In the laser measurement system 10, as shown in FIG. 7, the emission-side control unit 61 includes a rotating posture signal generating circuit 81, a carrier wave generating circuit 82, and an output signal generating circuit 83 as the configuration for the information superimposing processing. In the emission-side control unit 61, a frequency for carrier is set and a carrier wave of the set frequency is modulated in response to a signal as communication information. Thereby the communication information is superimposed on the measuring laser beam L (three irradiation optical beams S1, S2 and S3). This is because frequency characteristics in the received light signal processing unit 72 (ADC 91*b* to be described later (refer to FIG. 9)) in the laser receiving apparatus 12 can be made small.

The rotating posture signal generating circuit 81 generates and outputs a rotating posture signal Sr as communication information. The rotating posture signal generating circuit 81 is connected to the above-mentioned rotating angle detecting unit 65, and generates a rotating posture signal Sr showing a rotating posture of the rotary body 23 to the emission unit housing 32 from the reference position, that is, a rotating angle (direction where the irradiation optical axis Ai is directed) between the irradiation optical axis Ai and the reference position as viewed in the rotating direction, based upon a count signal that is output from the rotating angle detecting unit 65. In the present embodiment, the rotating posture signal generating circuit 81 has a DAC (digital to analog converter) 81*a* and a VCO (voltage controlled oscillator) 81*b*. The DAC 81*a* converts a count signal as a digital signal that is output from the counter 69 as the rotating angle detecting unit 65 into a count signal as an analog signal for output to the VOC 81*b*. The VCO 81*b* is a voltage control oscillator, and changes an oscillation frequency with a change in voltage of the count signal that is input from the DAC 81*a* (refer to a lower waveform in FIG. 8). Therefore in the rotating posture signal generating circuit 81, the count signal that is output from the rotating angle detecting unit 65 (counter 69) is converted into an analog signal in the DAC 81*a*, and the VOC 81*b* generates a rotating posture signal Sr (refer to the lower waveform in FIG. 8) in which the frequency is changed with a change of the count signal converted into the analog signal. Here, the rotating posture, as described above, can be shown by the rotating angle between the reference position and the irradiation optical axis Ai as viewed in the rotating direction around the center axis (the rotating axis Ar of the laser emitting mechanism 31) of the emission unit housing 32 as the rotation center. Therefore the rotating posture signal Sr becomes a signal of which a frequency changes successively in a range from zero degrees to less than 360 degrees to the reference position as viewed in the above rotating direction, and corresponds one-by-one to an angle (rotating angle) to the reference position (refer to the lower waveform in FIG. 8). The rotating posture signal generating circuit 81 (the VOC 81*b*) is connected to the output signal generating circuit 83 (multiplexer 83*b* to be described later), and outputs the generated rotating posture signal Sr to the output signal generating circuit 83 (multiplexer 83*b*).

The carrier wave generating circuit 82 generates a carrier wave for output. The carrier wave is used for carrying a rotating posture signal Sr as communication information, and is a signal within a frequency band set as the rotary laser emitting apparatus 11. The frequency band set as the rotary laser emitting apparatus 11 means to be in accordance with frequency characteristics set in the received light signal processing unit 72 (ADC 91*b* to be described later (refer to FIG. 9)) in the laser receiving apparatus 12 used as the laser measurement system 10. The carrier wave is set to a frequency different from the above-mentioned rotating posture signal Sr. The carrier wave generating circuit 82 is connected to the output signal generating circuit 83 (mixer 83*c* to be described later), and outputs the generated carrier wave to the output signal generating circuit 83 (mixer 83*c*).

The output signal generating circuit 83 combines the rotating posture signal Sr generated in the rotating posture signal generating circuit 81 with the carrier wave generated in the carrier wave generating circuit 82 to generate a carrier wave as an output signal. In the present embodiment, the output signal generating circuit 83 includes a comparator 83*a*, the multiplexer 83*b* and the mixer 83*c*.

The comparator 83*a* generates a selection control signal for controlling an operation in the multiplexer 83*b*, and outputs the selection control signal to the multiplexer 83*b*. The comparator 83*a* is connected to the counter 69 in the rotating angle detecting unit 65, and a count signal is input thereto from the counter 69. A comparing signal is input to the comparator 83*a* from the emission-side control unit 61, which is not shown. The comparator 83*a* compares the comparing signal with the count signal to generate a selection control signal depending on the magnitude, and outputs the generated selection control signal to the multiplexer 83*b*.

The multiplexer 83*b* outputs a plurality of input signals as a single output signal. The multiplexer 83*b* is connected to the VCO 81*b* of the rotating posture signal generating circuit 81, and a rotating posture signal Sr is input thereto from the rotating posture signal generating circuit 81 (VCO 81*b*). The multiplexer 83*b* outputs the rotating posture signal Sr to the mixer 83*c* based upon the selection control signal from the comparator 83*a* and the rotating posture signal Sr from the rotating posture signal generating circuit 81. It should be noted that in the multiplexer 83*b*, as to the configuration that information (its signal) in a frequency band different from the rotating posture signal Sr is combined with the rotating posture signal Sr, which is input to the mixer 83*c*, the information in the different frequency band is selectively output to the mixer 83*c* with the rotating posture signal Sr based upon the selection control signal from the comparator 83*a*. Such information may include, for example, a channel signal for identifying the rotary laser emitting apparatus 11 that emits a measuring laser beam. L (three irradiation optical beams S1, S2 and S3). With this configuration, in the rotary laser emitting apparatus 11 (emission-side control unit 61), this information in addition to the rotating posture signal Sr can be superimposed on the three irradiation optical beams S1, S2 and S3 (measuring laser beam L). In a case of superimposing the above channel signal in addition to the rotating posture signal Sr in the rotary laser emitting apparatus 11 (emission-side control unit 61), even in a case of executing inclination adjustment processing to be described later in a state of using a plurality of rotary laser emitting apparatuses 11, it becomes easy to appropriately adjust the inclination of the reference plane Pb in a desired rotary laser emitting apparatus 11.

The mixer 83*c* is connected to the carrier wave generating circuit 82, and a carrier wave is input to the mixer 83*c* from the carrier wave generating circuit 82. The mixer 83*c* changes an amplitude of the carrier wave that is input thereto from the carrier wave generating circuit 82 in response to the rotating posture signal Sr that is input from the multiplexer 83*b* to superimpose the rotating posture signal Sr on the carrier wave. In the mixer 83*c*, the rotating posture signal Sr from the rotating posture signal generating circuit 81 that is input from the multiplexer 83*b* is superimposed on the carrier wave that is a signal within the frequency band set as the rotary laser emitting apparatus 11.

Therefore the output signal generating circuit 83 generates the carrier wave on which the rotating posture signal Sr is superimposed. The output signal generating circuit 83 (its mixer 83*c*) is connected to the optical source drive unit 62, and outputs the carrier wave (the signal) on which the rotating posture signal Sr is superimposed, to the optical source drive unit 62. Therefore the above operation becomes the information superimposing processing in the emission-side control unit 61.

As a result, the optical source drive unit 62 modulates the amplitude (intensity) in response to the superimposed rotating posture signal Sr based upon the input carrier wave (the signal), while driving the laser beam emitting unit 51. Therefore the laser beam emitting unit 51 (refer to FIG. 3) emits the measuring laser beam L in accordance with the carrier wave on which the rotating posture signal Sr is superimposed, and the laser emitting mechanism 31 rotates and emits three irradiation optical beams S1, S2 and S3 (measuring laser beam L) in accordance with the carrier wave on which the rotating posture signal Sr is superimposed. Therefore the rotating posture signal Sr showing the rotating posture (the rotating angle (direction where the irradiation optical axis Ai is directed) between the irradiation optical axis Ai and the reference position as viewed in the rotating direction) of the rotary body 23 to the emission unit housing 32 in the rotary laser emitting apparatus 11 is superimposed on the three irradiation optical beams S1, S2 and S3 (measuring laser beam L). Since the rotating posture signal Sr is generated as described above, the rotating posture signal Sr shows which rotating posture the rotary body 23 is made to take to the emission unit housing 32 at the time the three irradiation optical beams S1, S2 and S3 (measuring laser beam L) are emitted. In other words, the rotating posture signal Sr shows to which direction the irradiation optical axis Ai is directed to the emission unit housing 32 at the time the three irradiation optical beams S1, S2 and S3 (measuring laser beam L) are emitted. Therefore in the rotary laser emitting apparatus 11, it is possible to figure out that the three irradiation optical beams S1, S2 and S3 (measuring laser beam L) are emitted at the time which rotating posture the rotary body 23 is made to take to the emission unit housing 32, that is, at the time to which direction the irradiation optical axis Ai is directed to the emission unit housing 32, by the rotating posture signal Sr superimposed on the three irradiation optical beams S1, S2 and S3 (measuring laser beam L).

Figure 9:
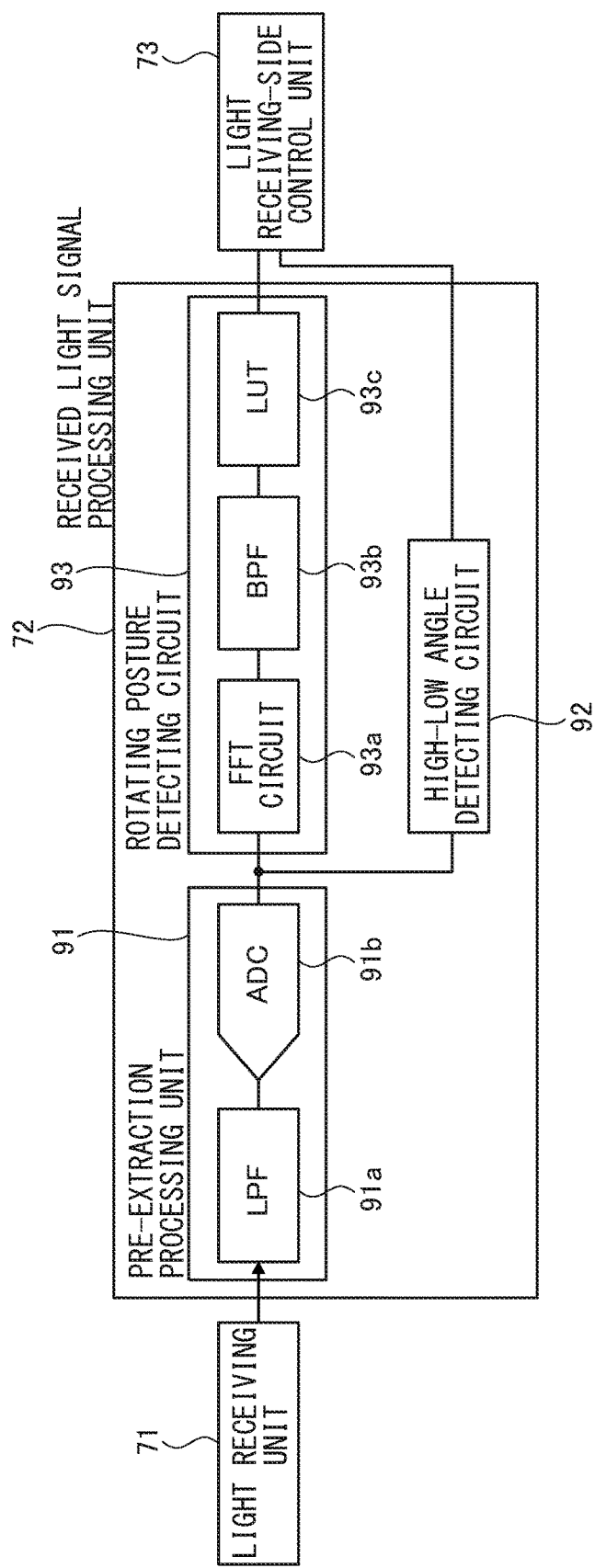
FIG. 9 is an explanatory diagram showing the configuration of a received light signal processing unit of the laser receiving unit by function blocks.

For obtaining the rotating posture signal Sr, in the laser receiving apparatus 12, the received light signal processing unit 72 to which a received light signal is input from the light receiving unit 71 executes optical beam state detecting processing that detects a state of the three irradiation optical beams S1, S2 and S3 (measuring laser beam L) received in the light receiving unit 71. The received light signal processing unit 72, as shown in FIG. 9, includes a pre-extraction processing circuit 91, a high-low angle detecting circuit 92, and a rotating posture detecting circuit 93. In the received light signal processing unit 72, when received light signals of the three irradiation optical beams S1, S2 and S3 (measuring laser beam L) are input thereto from the light receiving unit 71, a rotating posture (a rotating angle (direction where the irradiation optical axis Ai is directed) between the irradiation optical axis Ai and the reference position as viewed in the rotating direction) of the rotary body 23 to the emission unit housing 32 at the time the three irradiation optical beams S1, S2 and S3 (measuring laser beam L) are emitted and a high-low angle θv to the reference plane Pb of a location (target position) to be measured where the laser receiving apparatus 12 is installed are found based upon the received light signal. That is, the rotating posture (rotating angle) and the high-low angle θv configure an optical beam state of the three received irradiation optical beams S1, S2 and S3 (measuring laser beam L).

The pre-extraction processing circuit 91 is connected to the above-mentioned light receiving unit 71, and received light signals (refer to FIGS. 10A to 10C) by receiving three irradiation optical beams S1, S2 and S3 (measuring laser beam L) are input thereto from the light receiving unit 71. The pre-extraction processing circuit 91 can execute each signal processing of the received light signals in the high-low angle detecting circuit 92 and the rotating posture detecting circuit 93, and eliminates extra components in the received light signal. In the present embodiment, the pre-extraction processing circuit 91 includes an LPF (low pass filter) 91*a* and an ADC (analog to digital converter) 91*b*. The LPF 91*a* eliminates frequency components exceeding a predetermined frequency in the received light signal that is input from the light receiving unit 71. The ADC 91*b* converts the received light signal that is the analog signal from which a high frequency component is eliminated through the LPF 91*a* into a received light signal as a digital signal (refer to FIG. 10B), which is output to the high-low angle detecting circuit 92 and the rotating posture detecting circuit 93. In the ADC 91*b*, a sampling cycle is set to correspond to the frequency band that is set to the carrier wave in the rotary laser emitting apparatus 11. Thereby it is possible to reduce the frequency characteristics to be small in the ADC 91*b* (received light signal processing unit 72). Therefore the pre-extraction processing circuit 91 eliminates noise components in the received light signal that is input from the light receiving unit 71 through the LDF 91*a*, and thereafter, demodulates the received light signal through the ADC 91*b*.

The high-low angle detecting circuit 92, as described above, calculates a high-low angle θv (refer to FIG. 6A to FIG. 6D) to the reference plane Pb, of the laser receiving apparatus 12 (light receiving unit 71) that receives the measuring laser beam L (three irradiation optical beams S1, S2 and S3), based upon the received light signal that are input from the pre-extraction processing circuit 91. The high-low angle detecting circuit 92 is connected to the light receiving-side control unit 73, and outputs the calculated high-low angle θv (the information) to the light receiving-side control unit 73.

The rotating posture detecting circuit 93 calculates a rotating posture of the rotary body 23 to the emission unit housing 32 at the time the three irradiation optical beams S1, S2 and S3 (measuring laser beam L) are emitted, that is, a rotating angle (direction where the irradiation optical axis Ai is directed) between the irradiation optical axis Ai and the reference position as viewed in the rotating direction). The rotating posture signal Sr (refer to a lower waveform in FIG. 8) showing which rotating posture the rotary body 23 is made to take to the emission unit housing 32 at the time the three irradiation optical beams S1, S2 and S3 (measuring laser beam L) are emitted, in other words, to which direction the irradiation optical axis Ai is directed to the emission unit housing 32 at the time the three irradiation optical beams S1, S2 and S3 (measuring laser beam L) are emitted, is, as described above, superimposed on the three irradiation optical beams S1, S2 and S3 (measuring laser beam L). Therefore the rotating posture detecting circuit 93 extracts the rotating posture signal Sr from the above-mentioned received light signal to calculate a rotating posture of the rotary body 23 to the emission unit housing 32. In the present embodiment, the rotating posture detecting circuit 93 includes an FFT circuit (Fast Fourier Transformer Circuit) 93a, a BPF (Band Pass Filter) 93b, and an LUT (Look Up Table) 93c.

Figure 10A:
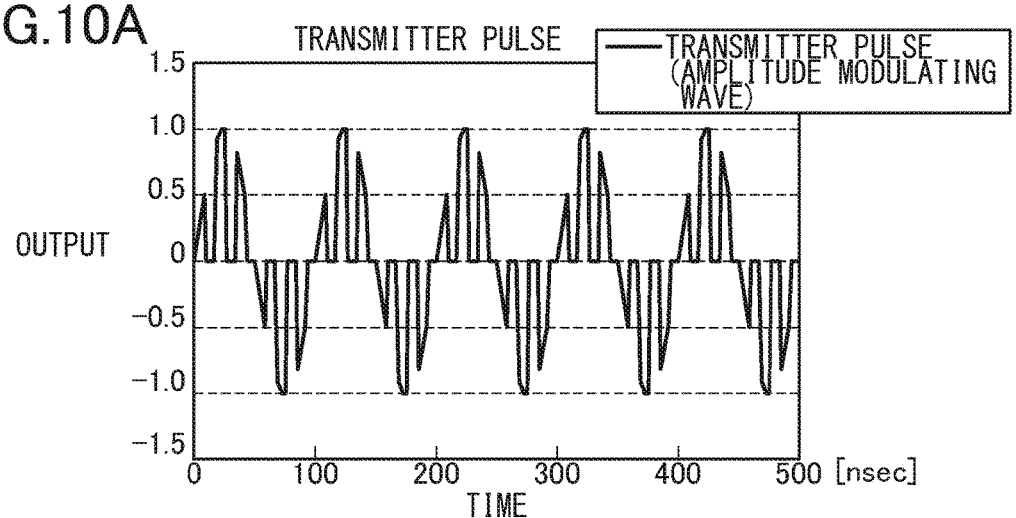
Figure 10B:
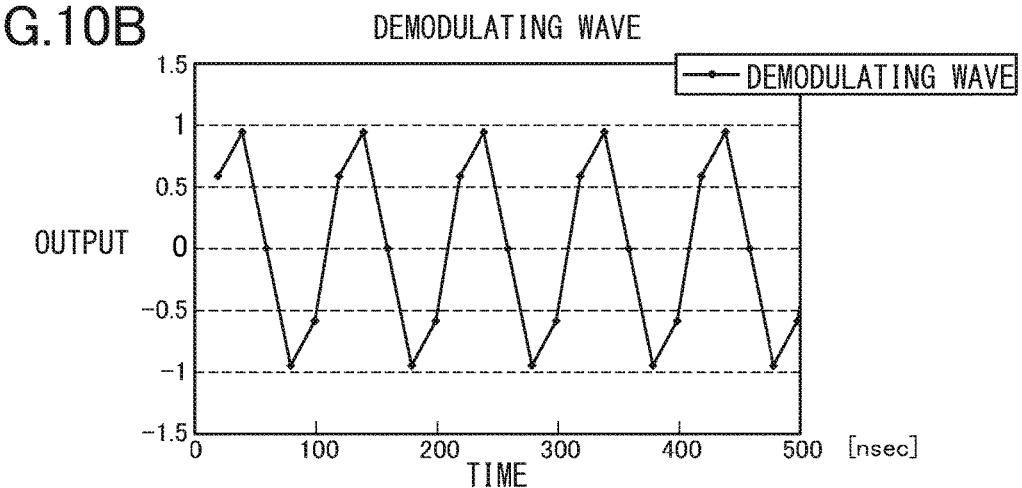
Figure 10C:
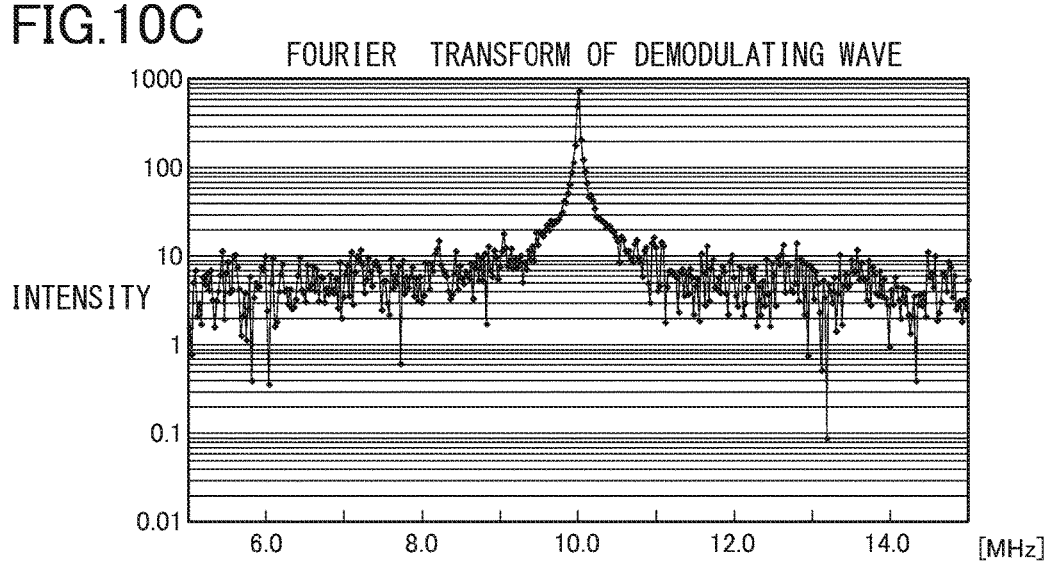

The FFT circuit 93a is a high-speed Fourier transform circuit, and performs Fourier transform of the received light signal as the demodulated wave that is input from the ADC 91b (pre-extraction processing circuit 91) to find a component ratio of frequencies in the received light signal (refer to FIG. 10C). The FFT circuit 93a outputs the component ratio (the information) of the frequencies in the received light signal to the BPF 93b.

The BPF 93b transmits components within a predetermined frequency band (frequency component) in the component ratio of the frequencies in the received light signal that is input from the FFT circuit 93a, and blocks transmission of frequency components other than this. The BPF 93b sets the frequency band set in the rotating posture signal Sr superimposed on the carrier wave as a predetermined frequency band for transmission. Therefore The BPF 93b extracts only the frequency band set as the rotating posture signal Sr from the component ratio of the frequencies in the received light signal that is output from the FFT circuit 93a.

The LUT 93c outputs an angle in accordance with the input frequency. In the LUT 93c, an angle (rotating angle) in accordance with a frequency is set to correspond to a rotating posture signal Sr that is set in the rotating posture signal generating circuit 81 (the VOC 81b (refer to FIG. 7)) and of which the frequency corresponds one-to-one to the rotating angle to the reference position. In the LUT 93c, a frequency (peak (the highest point)) having the maximum intensity is detected from a component ratio of the frequencies of the received light signal in the frequency band set as the rotating posture signal Sr by the BPF 93b, and thereby the frequency as the rotating posture signal Sr is extracted. In addition, in the LUT 93c, a rotating angle between an irradiation optical axis Ai and a reference position at the time three irradiation optical beams S1, S2 and S3 (measuring laser optical beam L) are emitted, is calculated by detecting the angle in accordance with the extracted frequency. This rotating angle, since the rotating posture signal Sr is set as described above, shows the rotating posture (direction where the irradiation optical axis Ai is directed) of the rotary body 23 to the emission unit housing 32 at the time of emitting the three irradiation optical beams S1, S2 and S3 (measuring laser optical beam L) received in the light receiving unit 71 of the laser light receiving apparatus 12.

From the above, the rotating posture detecting circuit 93 finds a component ratio of the frequencies in the received light signal as the demodulated wave that is input from the ADC 91b (pre-extraction processing circuit 91) by the FFT circuit 93a, and the BPF 93b narrows down the frequency band in accordance with the rotating posture signal Sr therefrom. Then, the rotating posture signal Sr is extracted by the LUT 93c to calculate the rotating angle between the irradiation optical axis Ai and the reference position as viewed in the rotation direction that is the rotating posture (direction where the irradiation optical axis Ai is directed) of the rotary body 23 to the emission unit housing 32 at the time of emitting the three irradiation optical beams S1, S2 and S3 (measuring laser optical beam L). The rotating posture detecting circuit (the LUT 93c) is connected to the light receiving-side control unit 73, and outputs the rotating posture (rotating angle (the information)) of the rotary body 23 to the calculated emission unit housing 32 to the light receiving-side control unit 73.

In this way, in the received light signal processing unit 72, the rotating posture of the rotary body 23 to the emission unit housing 32 at the time the three irradiation optical beams S1, S2 and S3 (measuring laser beam L) are emitted, that is, the rotating angle (direction where the irradiation optical axis Ai is directed) between the irradiation optical axis Ai and the reference position as viewed in the rotating direction, and the high-low angle θv to the reference plane Pb, of the laser receiving apparatus 12 (the light receiving unit 71) having received the three irradiation optical beams S1, S2 and S3 (measuring laser optical beam L), can be found. That is, in the received light signal processing unit 72, the rotating posture (rotating angle) of the irradiation optical axis Ai to the body case 24 in the three irradiation optical beams S1, S2 and S3 (measuring laser beam L) received in the laser receiving apparatus 12 (the light receiving unit 71), which is the optical beam state of the three irradiation optical beams S1, S2 and S3 (measuring laser beam L) received in the light receiving unit 71, and the high-low angle θv to the reference plane Pb (irradiation optical axis Ai) in the three irradiation optical beams S1, S2 and S3 (measuring laser optical beam L) received in the laser receiving apparatus 12 (the light receiving unit 71) can be found. Therefore operations in the pre-extraction processing circuit 91, the high-low angle detecting circuit 92, and the rotating posture detecting circuit 93 form optical beam state detecting processing in the received light signal processing unit 72 that detects the optical beam state of the three irradiation optical beams S1, S2 and S3 (measuring laser beam L) received.

Figure 11A:
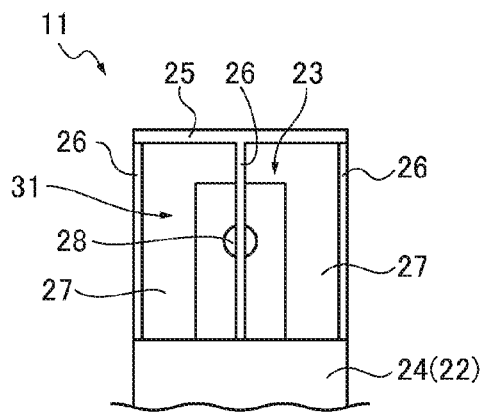
Figure 11B:
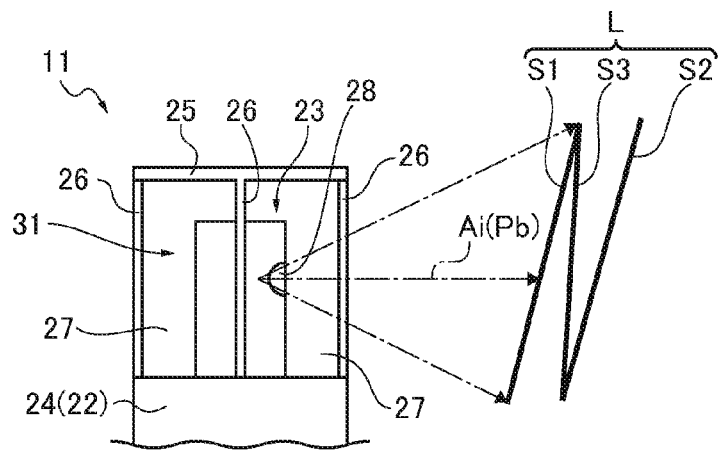
Figure 11C:
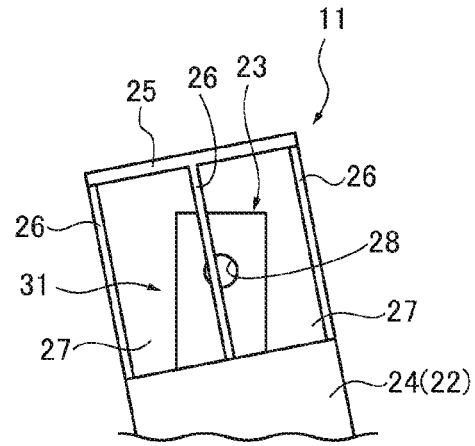

The laser receiving apparatus 12 executes the treatment determination processing of the irradiation optical beams S1, S2 and S3 received in the light receiving unit 71, based upon the detected optical beam state. Hereinafter, an explanation will be made of the treatment determination processing. First, in the rotary laser emitting apparatus 11, an explanation will be made of a state where it is difficult to ensure accuracy in measurement based upon three irradiation optical beams S1, S2 and S3 (measuring laser beam L) with reference to FIG. 11A to FIG. 11C and FIG. 12A to FIG. 12D. It should be noted that FIG. 11B emphatically shows spreading of the three irradiation optical beams S1, S2 and S3 (measuring laser beam L) formed as the fan beams for easy understanding. FIG. 11C emphatically shows an inclination of the emission unit housing 32 (laser emitting mechanism 31) to the body case 24 for easy understanding. Further, FIG. 12A to FIG. 12D each show a light shielding area As to one (support column 26) of four support columns 26. This is because in any support column 26, a state of shift of the light shielding area As depending upon a change in inclination and direction of the emission unit housing 32 (laser emitting mechanism 31) to be described later to the body case 24 is equal.

In the rotary laser emitting apparatus 11, as described above, the emission unit (pentaprism 54 (emission window 28) in the rotary body 23) that is the location for emitting the measuring laser beam L (three irradiation optical beams S1, S2 and S3) in the laser emitting mechanism 31 is positioned in an emission location between the ceiling portion 25 and the body case 24 above the body case 24. The emission location is provided in such a manner as to provide a cover member 27 between the upper part of the body case 24 and the ceiling portion 25, as well as in each position between the four support columns 26 (refer to FIG. 1A and FIG. 1B, FIG. 2, and the like). Therefore in the rotary laser emitting apparatus 11, when the laser emitting mechanism 31 rotates and emits a measuring laser beam L (three irradiation optical beams S1, S2 and S3) from the pentaprism 54 (emission window 28 in the rotary body 23) as the emission unit, in a position where any of the four support columns 26 is provided as viewed in the rotating direction of the rotary body 23 (irradiation optical axis Ai) to the emission unit housing 32, the measuring laser beam L (a part thereof) is blocked by the support column 26 (refer to FIG. 11A and FIG. 11B), and it is difficult to appropriately emit the measuring laser beam L. Therefore in the rotary laser emitting apparatus according to the present embodiment, the four support columns 26 are to form column parts that the irradiation optical axis Ai crosses at the time of rotating the irradiation optical axis Ai. Therefore even when the measuring laser optical beam L emitted in a predetermined range (hereinafter, light shielding area As (refer to FIG. 12A and FIG. 12B)) shielded by the support column 26 as viewed in the rotating direction of the rotary body 23 (irradiation optical axis Ai) from the rotary laser emitting apparatus 11 is received in the laser emitting apparatus 12, it is difficult to ensure accuracy of measurement based upon the light receiving.

Figure 12A:
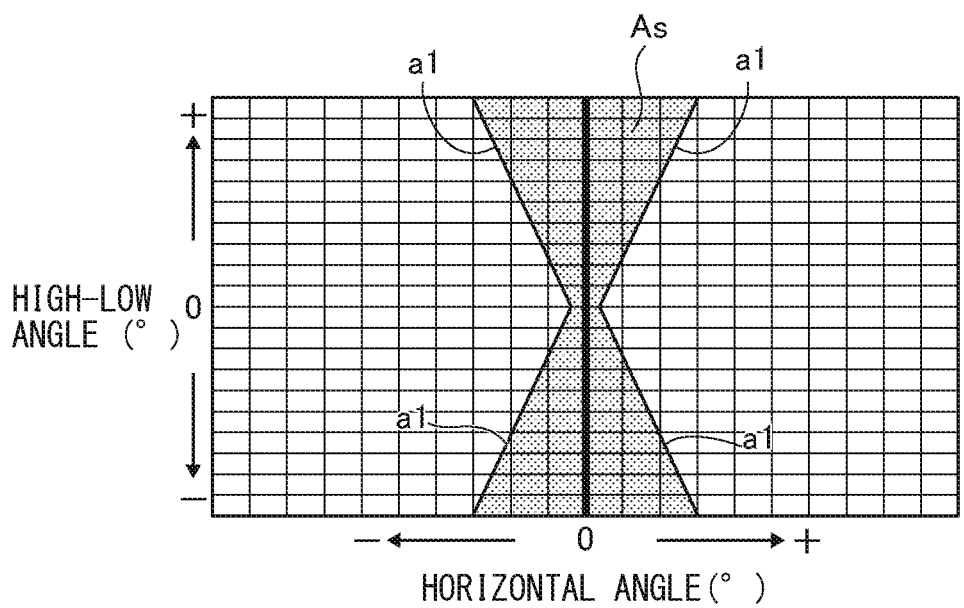

In the present embodiment, the light shielding area As is defined by a rotating posture (rotating angle (horizontal angle in the present embodiment)) of an irradiation optical axis Ai in the rotating direction around the center axis (rotating axis Ar) of the emission unit housing 32, and a high-low angle θv to the reference plane Pb (irradiation optical axis Ai), as viewed from the emission unit (pentaprism (emission window 28) in the rotary body 23) of the laser emitting mechanism 31 that is the location for emitting the measuring laser beam L in the rotary laser emitting apparatus 11, in the three irradiation optical beams S1, S2 and S3 (measuring laser beam L). This is as follows. Since the light shielding area As is determined by a position relation of each support column 26 to the emission unit of the rotating laser emitting mechanism 31 that is rotated, when a position where the support column 26 is provided is defined as a reference (zero degrees) as viewed in the rotating direction (horizontal angle direction) around the center axis (rotating axis Ar) of the emission unit housing 32 that is the rotation center of the rotary body 23 (laser emitting mechanism 31) as shown in FIG. 12A to FIG. 12D, the light shielding area As is basically generated within a predetermined angle range from the reference (zero degrees). In addition, the light shielding area As changes with a change in high-low angle θv to the reference plane Pb in the three irradiation optical beams S1, S2 and S3 (measuring laser beam L) even if the rotating posture (direction where the irradiation optical axis Ai is directed) of the rotary body 23 to the emission unit housing 32 as viewed in the rotating direction is equal (refer to FIG. 12A). That is, as the light shielding area As, when a state where the emission unit housing 32 (laser emitting mechanism 31) is not inclined to the body case 24 is taken as an example (refer to FIG. 11A), as shown in FIG. 12A, the angle range as viewed in the rotating direction (horizontal angle direction) in a case where the high-low angle θv to the irradiation optical axis Ai (reference plane Pb) is zero degrees is the smallest, and the angle range is the larger as viewed in the rotating direction (horizontal angle direction) as an absolute value of the high-low angle θv is larger. This is estimated to be caused by the event that, as shown in FIG. 11B, an interval to the support column 26 is the smallest in a case where the measuring laser optical beam L advances on the irradiation optical axis Ai, and the interval to the support column 26 is the larger as the advancing direction displaces upward in an elevation angle direction) to the irradiation optical axis Ai, or as the advancing direction displaces downward (in a depression angle direction) to the irradiation optical axis Ai.

Figure 12B:
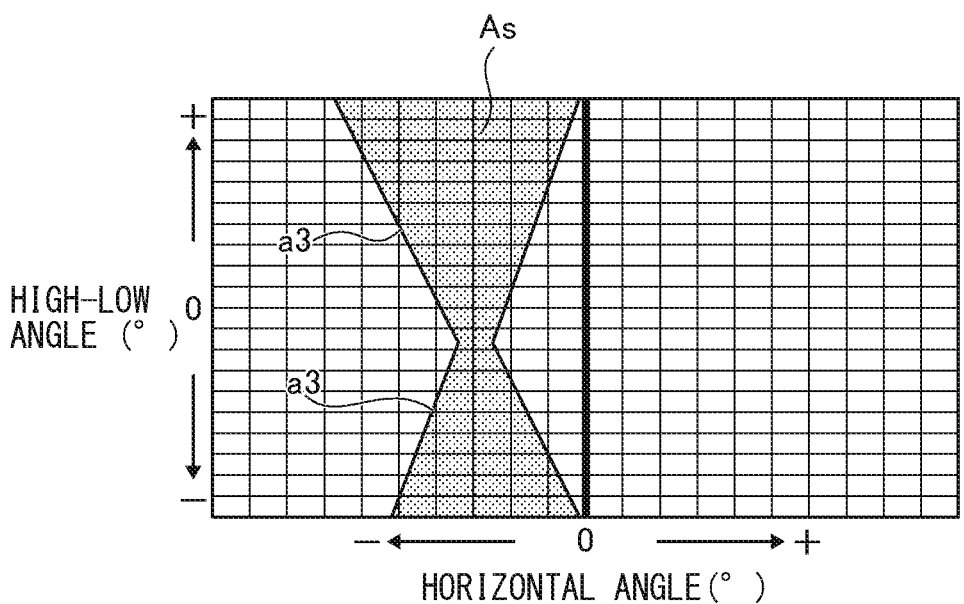

In addition, in the rotary laser emitting apparatus 11, as described above, it is possible to adjust the inclination and direction of the emission unit housing 32 (laser emitting mechanism 31) to the body case 24, and when the emission unit housing 32 (laser emitting mechanism 31) is inclined to the body case 24, the above-mentioned light shielding area As shifts (refer to FIG. 12B). As this example, there is shown the configuration that the rotary laser emitting apparatus 11 is installed in a state where the body case 24 is inclined, and the laser emitting mechanism 31 is made in a vertical state (posture where the emission unit housing 32 (the center axis (rotating axis Ar)) extends along the vertical direction) (refer to FIG. 11C). Then, in the rotary laser emitting apparatus 11, as is apparent from comparison between FIG. 11A and FIG. 11C, a position relation of each support column 26 to the emission unit (pentaprism 54 (emission window 28 of the rotary body 23)) of the laser emitting mechanism 31 to be rotated changes. FIG. 12B shows an appearance state where among the respective support columns 26, a light shielding area As to the support column 26 on the near side in a front view of FIG. 11C shifts. The light shielding area As, as shown in FIG. 12B, shifts at the opposite to the transfer direction of the emission window 28 (emission unit) to the support column 26 as viewed in a side of receiving three irradiation optical beams S1, S2 and S3 (measuring laser optical beam L), and relationship of a change in magnitude of the angle range as viewed in the rotating direction to the change of the high-low angle θv also shifts. Such a shift of the light shielding area As changes with the change in the position relation of the emission window 28 (emission unit) to the support column 26. Therefore the aspect of the light shielding area As in a position where four support columns 26 are provided as viewed in the rotating direction is determined by the inclination and direction of the emission unit housing 32 (the center axis (rotating axis Ar)), that is, the laser emitting mechanism 31 to the body case 24 (hereinafter, also referred to as an inclination state of the emission unit housing 32 (laser emitting mechanism 31) to the body case 24).

From the above configuration, when the laser receiving apparatus 12 (the light receiving-side control unit 73) obtains information of the inclination state of the emission unit housing 32 (laser emitting mechanism 31) to the body case 24, it is possible to find the light shielding area As (the information) in the near position of at least the four support columns 26 as viewed in the rating direction corresponding to the inclination state. In the laser measurement system 10 in the present embodiment, a plurality of light shielding areas As (the information) corresponding to the inclination state of the emission unit housing 32 (laser emitting mechanism 31) to the body case 24 are beforehand set, and the respective light shielding areas As (the information) are stored in the memory unit 77 in the laser receiving apparatus 12, thus making it possible for the light receiving-side control unit 73 in the laser receiving apparatus 12 to obtain the information. In the laser measurement system 10, the emission-side control unit in the rotary laser emitting apparatus 11 sends the inclination state (the information) of the emission unit housing 32 (laser emitting mechanism 31) to the body case 24 that is detected in the inclination state detecting unit 67 to the light receiving-side control unit 73 in the laser receiving apparatus 12 by using the emission-side communication unit 68 in the rotary laser emitting apparatus 11 (refer to FIG. 4) and the light receiving-side communication unit 80 in the laser receiving apparatus 12 (refer to FIG. 5). Therefore the laser light receiving apparatus 12 (the light receiving-side control unit 73) reads out a light shielding area As (the information) adapting for the obtained inclination state of the emission unit housing 32 (laser emitting mechanism 31) to the body case 24 from the memory unit 77, and thereby the light shielding area As (the information) adapting for the rotary laser emitting apparatus 11 at the present state can be found.

Figure 13:
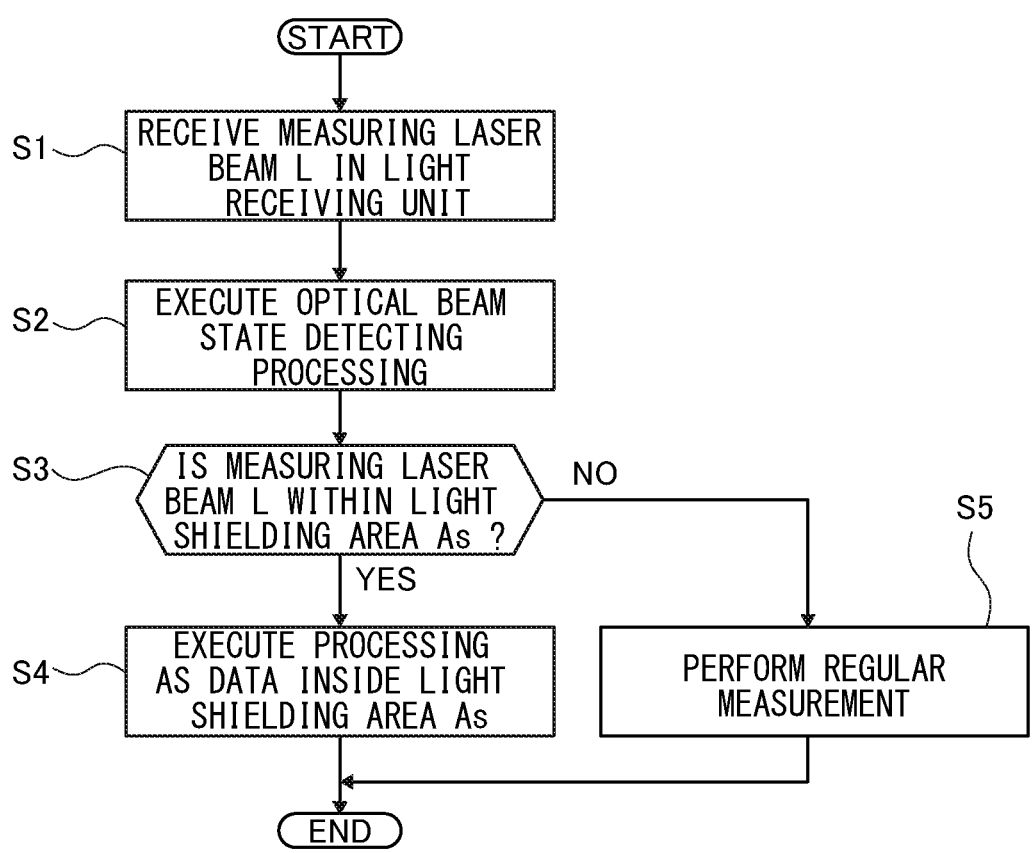
FIG. 13 is a flowchart showing a treatment determination processing content that is executed in a light receiving-side control unit in the present embodiment.

In the laser receiving apparatus 12, the light shielding area As (the information) is used to execute the treatment determination processing of the irradiation optical beams S1, S2 and S3 received in the light receiving unit 71. The treatment determination processing is executed under control of the light receiving-side control unit 73 by the program stored in the memory unit 77 (refer to FIG. 5) or the incorporated memory unit (not shown). FIG. 13 is a flow chart showing a content of the treatment determination processing that is executed in the light receiving-side control unit 73 in the present embodiment. Hereinafter, each step of the flow chart shown in FIG. 13 will be explained. The treatment determination processing starts with an operation of performing the measurement in the input unit 76 (refer to FIG. 5). The laser receiving apparatus 12 (the light receiving-side control unit 73) obtains the inclination state to the body case 24, of the emission unit housing 32 (laser emitting mechanism 31) in the rotary laser emitting apparatus 11 that is the target as described above before starting the treatment determination processing, and reads out the light shielding area As (the information) adapting for the inclination state for setting. In the explanation of the treatment determination processing, the center axis of the body case 24 is set along the vertical direction, and the emission unit housing 32 (the center axis (rotating axis Ar)) is not inclined to the body case 24 (the laser emitting mechanism 31 is in the vertical state), wherein the light shielding area As shown in FIG. 12A is selected as the adapted light shielding area As (the information).

In step S1, a measuring laser beam L (three irradiation optical beams S1, S2 and S3) is received in the light receiving unit 71, and the process goes to step S2. In this step S1, when the measuring laser beam L (three irradiation optical beams S1, S2 and S3) is received in the light receiving unit 71 and the received light signal in response thereto is output to the received light signal processing unit 72, the process goes to step S2 for detecting an optical beam state of the measuring laser beam L (three irradiation optical beams S1, S2 and S3) from the received light signal.

In step S2, optical beam state detecting processing is executed following the light receiving of the measuring laser beam L in step S1, and the process goes to step S3. In step S2, as described above, the optical beam state detecting processing is executed in the received light signal processing unit 72, and the optical beam state, that is, the rotating posture (rotating angle) of the irradiation optical axis Ai to the body case 24 in the measuring laser beam L (three irradiation optical beams S1, S2 and S3) received in the laser receiving apparatus 12 (the light receiving unit 71), and the high-low angle θv to the reference plane Pb (irradiation optical axis Ai) in the measuring laser beam L (three irradiation optical beams S1, S2 and S3) received in the laser receiving apparatus 12 (the light receiving unit 71) are found.

In step S3, subsequent to executing the optical beam state detecting processing in step S2, it is determined whether the measuring laser beam L is within the light shielding area As based upon the optical beam state obtained therein. In a case of "Yes" in step S3, the process goes to step S4, and in a case of "No" in step S3, the process goes to step S5. In step S3, the rotating posture (rotating angle (horizontal angle)) and the high-low angle θv as the optical beam state found by the optical beam state detecting processing in step S2 are used to determine whether the received measuring laser beam L (three irradiation optical beams S1, S2 and S3) is within the light shielding area As. The details will be determined as follows. First, a graph shown in FIG. 12A shows the light shielding area As to the support column 26 on the near side in a front view of FIG. 11A. The light receiving-side control unit 73 obtains information of the position (rotating angle) of the support column 26 as viewed in the rotating direction of the rotary body 23 (laser emitting mechanism 31) to the reference plane in the rotary laser emitting apparatus 11. This information can be in advance stored in the memory unit 77 (refer to FIG. 5) since a position (rotating angle) of each of the four support columns 26 in the rotary laser emitting apparatus 11 is in advance determined. In addition, the light receiving-side control unit 73 may obtain this information from the emission-side control unit 61 through the light receiving-side communication unit 80 and the emission-side communication unit 68. In addition, the light receiving-side control unit 73 converts the rotating posture (rotating angle) as the optical beam state into a rotating angle (horizontal angle in an example shown in FIG. 12A) on a basis of a position (rotating angle) of the support column 26, and points shown by the rotating angle (horizontal angle) and the high-low angle θv as the optical beam state are depicted on the graph shown in FIG. 12A. The light receiving-side control unit 73 determines whether the optical beam state found in step S2 is within the light shielding area As by determining whether the depicted point is on the light shielding area As (location where dots are attached in FIG. 12A). In this way, in step S3, it is determined whether the measuring laser beam L (three irradiation optical beams S1, S2 and S3) having arrived at the light-received position (light receiving unit 71) is within the light shielding area As by applying the rotating posture (rotating angle) and the high-low angle θv found in step S2 to the graph shown in FIG. 12A. In a case where the measuring laser beam L is within the light shielding area As, the process goes to step S4 for executing treatment processing that is different from the regular measurement. In a case where the measuring laser beam L is not within the light shielding area As, the process goes to step S5 for executing treatment processing of the regular measurement.

In step S4, subsequent to the determination that the measuring laser beam L is within the light shielding area As in step S3, the processing as data inside the light shielding area As is executed, and the treatment determination processing is completed. In step S4, because of the determination that the measuring laser beam L is within the light shielding area As in step S3, it is determined that the received measuring laser beam L (three irradiation optical beams S1, S2 and S3) is blocked by the support column 26 and it is difficult to ensure accuracy of the measurement based upon the light receiving, executing the processing as data inside the light shielding area As. In the present embodiment, in the processing as the data inside the light shielding area As, the measurement in the same way as the regular measurement is performed, and the information showing the data inside the light shielding area As is associated with the measurement result, these pieces of the data being stored as needed. In addition thereto, in the present embodiment, a warning that it is difficult to ensure accuracy of the measurement is made at measuring. This warning may include, for example, displaying that information on the display unit 74, causing the warning unit 75 to ring a buzzer as a warning sound or performing them at the same time. In addition, the processing as the data inside the light shielding area As may include making a warning that it is difficult to ensure accuracy of the measurement similarly to the above, thus not performing the measurement, not performing the measurement without particularly making a warning, and the like. In addition, at the warning thereof, the display unit 74 may display that the measuring laser beam L is within the light shielding area As.

In step S5, subsequent to the determination that the measuring laser beam L is not within the light shielding area As in step S3, the regular measurement is executed to complete the treatment determination processing. In step S5, because of the determination that the measuring laser beam L is not within the light shielding area As, it is determined that the received measuring laser beam L (three irradiation optical beams S1, S2 and S3) is not blocked by the support column 26, and it is possible to ensure accuracy of the measurement based upon the light receiving. Therefore the received measuring laser beam L (three irradiation optical beams S1, S2 and S3) is used to perform the measurement in the same way as the regular measurement, and the measurement result (the data) is stored as needed.

In a case of performing the measurement using the laser measurement system 10, an operator installs the laser receiving apparatus 12 to a location to be measured (target position) through the rod 14, causing the laser receiving apparatus 12 to receive a measuring laser beam. L (three irradiation optical beams S1, S2 and S3) emitted from the rotary laser emitting apparatus 11 installed in the known point X through the tripod stand 13 (refer to FIG. 1A). Then, in the laser receiving apparatus 12 (light receiving-side control unit 73), the process goes from step S1 to step S2 in a flow chart of FIG. 13, wherein a rotating posture (rotating angle (horizontal angle)) and a high-low angle θv of the measuring laser beam L (three irradiation optical beams S1, S2 and S3) having arrived at the received position (light receiving unit 71) as viewed from the rotary laser emitting apparatus 11 (the emission unit (the emission window 28 of the rotary body 23) of the pentaprism 54) of the laser emitting mechanism 31) are found. In a case where the measuring laser beam L (three irradiation optical beams S1, S2 and S3) having arrived at the received position (light receiving unit 71) (the optical beam state) is not within the light shielding area As, in the laser receiving apparatus 12 (light receiving-side control unit 73) the process goes from step S3 to step S5 in a flow chart of FIG. 13, wherein the received measuring laser beam L (three irradiation optical beams S1, S2 and S3) is used to perform the measurement. In addition, in a case where the measuring laser beam L (three irradiation optical beams S1, S2 and S3) having arrived at the light received position (light receiving unit 71) (the optical beam state) is within the light shielding area As, in the laser receiving apparatus 12 (light receiving-side control unit 73) the process goes from step S3 to step S4 in a flow chart of FIG. 13, wherein the processing as the data inside the light shielding area As is executed, and the received measuring laser beam L (three irradiation optical beams S1, S2 and S3) is used to perform the measurement, associating the information showing the data inside the light shielding area As with the measurement result. Therefore, in the laser receiving apparatus 12 (light receiving-side control unit 73) in the laser measurement system 10, it is determined whether the measuring laser beam L is blocked by the support column 26 in a stage of receiving the measuring laser beam L (three irradiation optical beams S1, S2 and S3), and the treatment of the received light signal of the measuring laser beam L is sectioned based upon the determination. Therefore the measurement result (the data) can be appropriately treated without performing an operation of determining the treatment of the measurement result (the data) after completing the measurement.

In addition, in the laser measurement system 10 in the present embodiment, it is possible to execute the inclination adjusting processing for adjusting the inclination of the reference plane Pb in the rotary laser emitting apparatus 11 on a basis of the position where the laser receiving apparatus 12 is installed. The inclination adjusting processing is to adjust the inclination of the reference plane Pb in the rotary laser emitting apparatus 11 using a straight line connecting the rotary laser emitting apparatus 11 (the emission unit (pentaprism 54 (the emission window 28 of the rotary body 23) of the laser emitting mechanism 31) and the laser receiving apparatus 12 (the light receiving unit 71) as the rotating axis. Hereinafter, the inclination adjusting processing will be explained with reference to FIG. 14A, FIG. 14B, FIG. 15A and FIG. 15B. It should be noted that in FIG. 14A, FIG. 14B, FIG. 15A and FIG. 15B, the GPS position measuring apparatus 15 (refer to FIG. 1A) is omitted for easy understanding.

in the rotary laser emitting apparatus 11 (the emission-side control unit 61), as described above, the rotating posture of the rotary body 23 to the emission unit housing 32 from the reference position, that is, the rotating posture signal Sr showing the rotating angle (direction where the irradiation optical axis Ai is directed) between the irradiation optical axis Ai and the reference position as viewed in the rotating direction is superimposed on the measuring laser beam L (three irradiation optical beams S1, S2 and S3) that is rotated and emitted. The rotating posture signal Sr is, as described above, a signal of which a frequency successively changes within a range from zero degrees to less than 360 degrees to the reference position as viewed in the rotating direction, and corresponds one-to-one to the angle (rotating angle) to the reference position (refer to the lower waveform in FIG. 8). In the rotary laser emitting apparatus 11, a pair of inclination mechanisms 41 are driven based upon detection signals from the pair of level sensors 49 under control of the emission-side control unit 61, thereby making it possible to incline the emission unit housing 32 (the center axis (rotating axis Ar)) in any direction and at any angle. In addition, in the laser receiving apparatus 12 (light receiving-side control unit 73), the rotating posture signal Sr that is superimposed on the measuring laser beam L (three irradiation optical beams S1, S2 and S3) received in the light receiving unit 71 is extracted as described above, and it is possible to obtain a rotating angle between the irradiation optical axis Ai and the reference position as viewed in the rotating direction that is the rotating posture (direction where the irradiation optical axis Ai is directed) of the rotary body 23 to the emission unit housing 32 at the time of emitting the measuring laser beams L (three irradiation optical beams S1, S2 and S3).

Figure 14A:
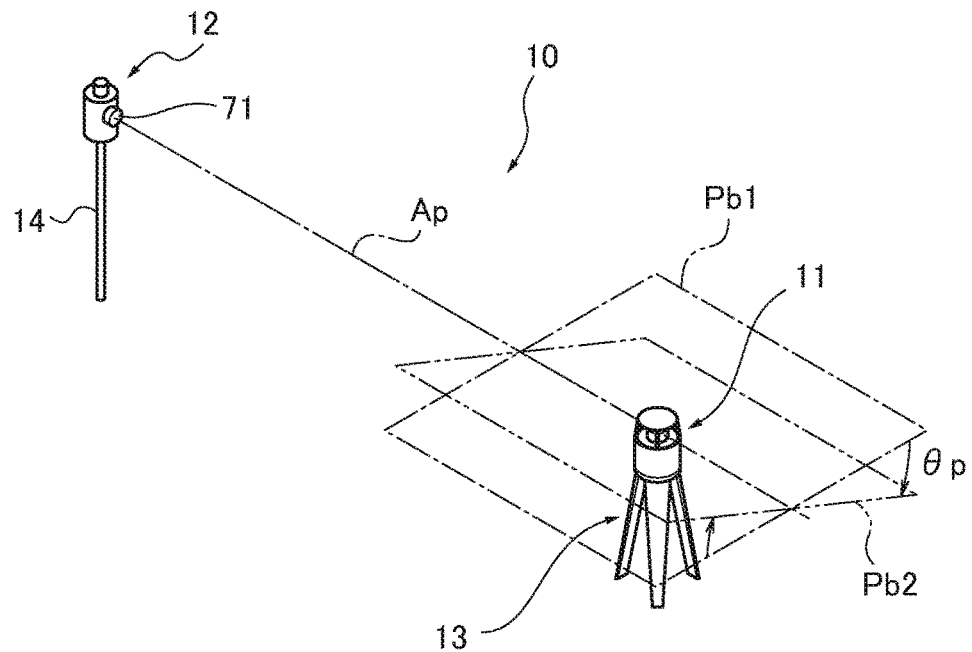

In the laser measurement system 10, for executing the inclination adjusting processing, the rotary laser emitting apparatus 11 is, as shown in FIG. 14A, installed in the known point X through the tripod stand 13 and the laser receiving apparatus 12 is installed in a position of the reference plane Pb to be a basis for adjustment. Here, in an example shown in FIG. 14A and FIG. 14B, the emission position (irradiation optical axis Ai) of the rotary laser emitting apparatus 11 and the center position of the light receiving unit 71 in the laser receiving apparatus 12 are in complete agreement as viewed in the height direction (vertical direction) (high-low angle θv=zero degrees) for easy understanding. The rotary laser emitting apparatus 11 forms a reference plane Pb1 by the irradiation optical axis Ai at the time of rotating and emitting the measuring laser beam L (three irradiation optical beams S1, S2 and S3). An operator causes the light receiving unit 71 in the laser receiving apparatus 12 to receive the measuring laser beam L emitted from the rotary laser emitting apparatus 11.

In the light receiving-side control unit 73 of the laser receiving apparatus 12, the rotating posture signal Sr is extracted from the received measuring laser beam L (three irradiation optical beams S1, S2 and S3) to obtain the rotating angle between the irradiation optical axis Ai and the reference position as viewed in the rotating direction, which is the rotating posture (direction where the irradiation optical axis Ai is directed) of the rotary body 23 to the emission unit housing 32 at the time of emitting the measuring laser beams L. In addition, the light receiving-side control unit 73 in the laser receiving apparatus 12 sends the rotating angle (the information) between the irradiation optical axis Ai and the reference position as viewed in the rotating direction in the received measuring laser beam L to the emission-side control unit 61 in the rotary laser emitting apparatus 11 through the light receiving-side communication unit 80 and the emission-side communication unit 68 in the rotary laser emitting apparatus 11. The rotating angle is, as described above, the rotating posture (direction where the irradiation optical axis Ai is directed) of the rotary body 23 to the emission unit housing 32 at the time of emitting the measuring laser beam L.

Figure 15A:
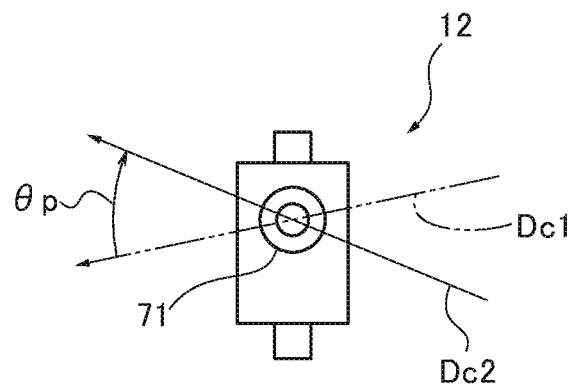

Therefore the emission-side communication unit 68 can obtain a direction (refer to sign Ap) of the laser receiving apparatus 12 (the light receiving unit 71) as viewed from the emission unit (pentaprism 54 (emission window 28 of the rotary body 23)) in the laser emitting mechanism 31. In the emission-side communication unit 68, the above-mentioned direction is set as an adjustment reference axis Ap for adjusting the reference plane Pb. In addition, in the rotary laser emitting apparatus 11, the emission unit housing 32 (the center axis (the rotating axis Ar of the laser emitting mechanism 31)) is rotated by a predetermined angle θp around the adjustment reference axis Ap as the rotating center by driving the pair of inclination mechanisms 41 as needed under control of the emission-side communication unit 68. Here, the predetermined angle θp may be set by an operating portion (not shown) of the rotary laser emitting apparatus 11 or by an operation to an input unit 76 of the laser receiving apparatus at the time of executing the inclination adjusting processing, or may be input to the emission-side control unit 61 or the light receiving-side control unit 73 from an external device (not shown). As a result, the rotary laser emitting apparatus 11 changes the reference plane Pb formed by the irradiation optical axis Ai from reference plane Pb1 to reference plane Pb2 at the time of rotating and emitting the three irradiation optical beams S1, S2 and S3 (measuring laser beam L). Therefore in the laser receiving apparatus 12, as shown in FIG. 15A a direction where the irradiation optical axis Ai of the rotary laser emitting apparatus 11 comes across the light receiving unit 71 changes from direction Dc1 to direction Dc2 of being rotated by a predetermined angle θp around the light receiving unit 71 (the center position). From this event, in the laser measurement system 10, the inclination adjusting processing is executed, and thereby a straight line connecting the rotary laser emitting apparatus 11 (the emission unit (pentaprism 54 (the emission window 28 of the rotary body 23)) of the laser emitting mechanism 31) and the laser receiving apparatus 112 (the light receiving unit 71) is defined as the adjustment reference axis Ap, and the reference plane Pb in the rotary laser emitting apparatus 11 can be changed from reference plane Pb1 to reference plane Pb2 around the adjustment reference axis Ap as the rotary axis. It should be noted that the light receiving-side control unit 73 in the lase receiving apparatus 12 may set the adjustment reference axis Ap, which will be sent to the emission-side control unit 61 in the rotary laser emitting apparatus 11. In addition, in the above-mentioned example, the emission position (irradiation optical axis Ai) of the rotary laser emitting apparatus 11 and the center position of the light receiving unit 71 in the laser receiving apparatus 12 are in complete agreement as viewed in the height direction (vertical direction) (high-low angle θv=zero degrees) (refer to FIG. 14A), but the position in the height direction therebetween may differ. In this case, it is possible to easily realize making the difference in the height direction therebetween by adding the high-low angle θv to the reference plane Pb (irradiation optical axis Ai) to the rotating posture (rotating angle) at the time of setting the adjustment reference axis Ap.

Figures 12C, 12D:
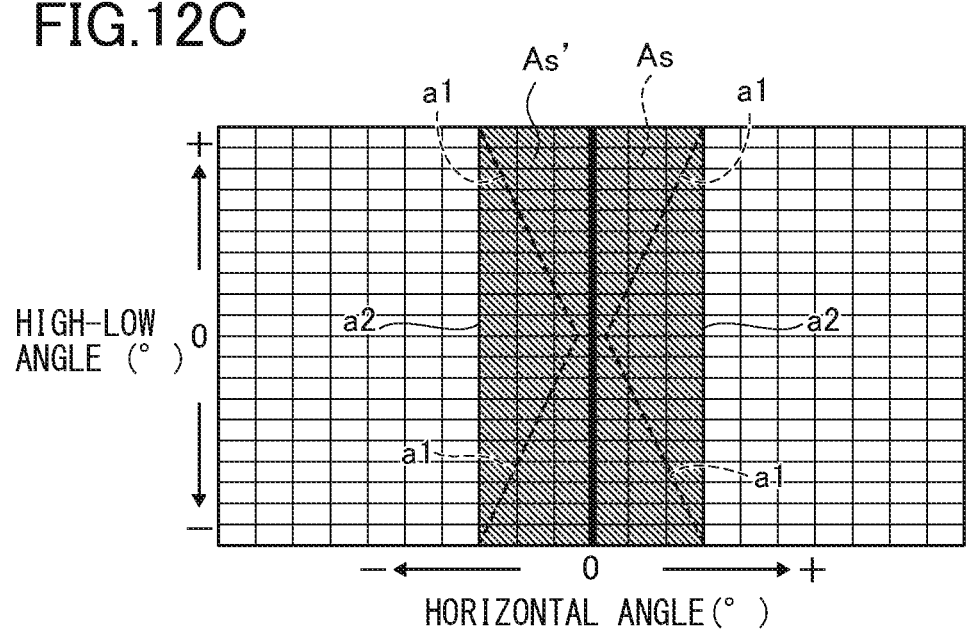

Next, the problem in the conventional technology will be explained with reference to FIG. 12C to FIG. 12D. The problem in the conventional technology will be the same as the problem in the laser measurement system 10 (the rotary laser emitting apparatus 11 and the laser receiving apparatus 12) in the present embodiment in a case where the information superimposing processing, the optical beam state detecting processing and the treatment determination processing that are described above are not executed therein, and therefore, will be explained with reference to signs identical to those in the laser measurement system 10 in the present embodiment.

Therefore in the rotary laser emitting apparatus 11, when the laser emitting mechanism 31 rotates and emits a measuring laser beam L (three irradiation optical beams S1, S2 and S3 from the emission unit (the pentaprism 54 (emission window 28 in the rotary body 23)), the measuring laser beam L (a part thereof) is blocked by the support column 26 in a position where any of the four support columns 26 is provided as viewed in the rotating direction of the rotary body 23 to the emission unit housing 32, and it is difficult to appropriately emit the measuring laser beam L. Therefore even in a case where the measuring laser optical beam L shielded by the support column 26 is received in the laser emitting apparatus 12, it is difficult to ensure accuracy of measurement based upon the light receiving.

Therefore in the rotary laser emitting apparatus 11, it is considered that a light shielding area As' (refer to FIG. 12C and FIG. 12D) as a predetermined range in which the measuring laser beam L (a part thereof) is shielded by the support column 26 as viewed in the rotating direction of the rotary body 23 (laser emitting mechanism 31) is beforehand set and an YES/NO signal showing whether the measuring laser beam L is within the light shielding area As' is superimposed on the measuring laser beam L. Then, in the laser receiving apparatus 12, the treatment of the measuring laser beam L on the measurement can be determined by obtaining the YES/NO signal superimposed on the measuring laser beam L as follows. For example, it is possible to perform the measurement using the received measuring laser beam L in a case where the measuring laser beam L is not within the light shielding area As', and the measurement using the received measuring laser beam L is not performed in a case where the measuring laser beam L is within the light shielding area As'.

In a case of the above-mentioned configuration, however, the light shielding area As' is defined only in a position as viewed in the rotating direction of the rotary body 23 (laser emitting mechanism 31) in the rotary laser emitting apparatus 11. This is because, in a case of the above-mentioned configuration, since the YES/NO signal is superimposed on the measuring laser beam L that is rotated and emitted from the rotary laser emitting apparatus 11, it is impossible to consider a change in high-low angle to the reference plane Pb in the measuring laser beam L. Therefore in the above-mentioned configuration, the light shielding area As' is necessary to include the entirety of the range in which the measuring laser beam L (a part thereof) is shielded by the support column 26 as viewed in the rotating direction. The details are as follows. Referring to a state where the emission unit housing 32 (laser emitting mechanism 31) is not inclined to the body case 24 as an example (refer to FIG. 11A and FIG. 11B), the light shielding area As, as described above, becomes one as shown in FIG. 12A. On the other hand, since the light shielding area As' is defined only in the position as viewed in the rotating direction of the rotary body 23, it is necessary to set the light shielding area As' in a position of covering the largest angle range in the light shielding area As. Therefore the light shielding area As', as shown in FIG. 11C, corresponds to the largest angle range in the light shielding range As. As a result the light shielding area As' includes an area (area interposed by both sides a1 sectioning the light shielding area As and both sides a2 sectioning the light shielding area As') that is not included in the light shielding area As. Here, the measuring laser beam L (a part thereof) is not shielded by the support column 26 in the area in the light shielding area As' not included in the light shielding area As, therefore making it possible to ensure accuracy of the measurement in that area. In the above-mentioned configuration, however, regardless of the measuring laser beam L received in the laser receiving apparatus 12 is appropriately emitted from the rotary laser emitting apparatus 11 without being not shielded by the support column 26, when the laser receiving apparatus 12 obtains the YES/NO signal that the measuring laser beam L is included in the light shielding area As', it is determined that the accuracy of the measurement cannot be ensured.

Particularly in a case where the rotary laser emitting apparatus 11 is configured such that the inclination and direction of the emission unit housing 32 (laser emitting mechanism 31) to the body case 24 can be adjusted, the light shielding area As, as described above, shifts in accordance with the inclination state (inclination and its direction) (refer to FIG. 12A and FIG. 12B). Therefore since it is necessary to set the light shielding area As' in consideration of this shift in the above configuration, all the aspects in a change of the inclination state is required to include the entire range where the measuring laser beam L (a part thereof) is shielded by the support column 26 as viewed in the rotating direction. The details are as follows. In an example where the rotary laser emitting apparatus 11 is installed in a state where the body case 24 is inclined and the emission unit housing (lase emitting mechanism 31) extends in the vertical direction (refer to FIG. 11C), the light shielding area As is as shown in FIG. 12B as described above. In addition, since the emission unit housing 32 (laser emitting mechanism 31) is inclined at an equal angle to the body case 24 in both of the right and left opposite sides to the example shown in FIG. 11C, the light shielding area As at that time is a mirror-reversed one from the graph shown in FIG. 12B (refer to the right light shielding area As shown in a two-dot chain line of FIG. 12D). Here, in the examples shown in FIG. 11C and FIG. 12B, the inclination of the emission unit housing 32 (laser emitting mechanism 31) to the body case 24 is estimated to be maximized. Then, since the light shielding area As' is defined only by the position as viewed in the rotating direction, the light shielding area As' is necessary to be set in the largest angle range among the shifting light shielding areas As of all the aspects. Therefore, as shown in FIG. 12D, the light shielding area As' corresponds to the largest angle range (light shielding area As shown in FIG. 12B) among the light shielding areas As of all the aspects. Accordingly the light shielding area As' results in including the light shielding areas As of all the aspects regardless of the aspect in the inclination state of the emission unit housing 32 (laser emitting mechanism 31) to the body case 24. In addition, the light shielding area As' results in including an area interposed by an outside side a3 in the light shielding area As where the inclination is maximized and an outside side a4 that sections the light shielding area As' (the same also in the opposing side).

Therefore in the above-mentioned configuration, also in a scene where the measuring laser beam L (a part thereof) is actually not shielded by the support column 26, the measuring laser beam L is determined to correspond to the set light shielding area As'. As a result, also in a scene where the accuracy of the measurement is ensured, it is determined that the accuracy of the measurement cannot be ensured. In addition, in the above-mentioned configuration, regardless of a scene where the measuring laser beam L (a part thereof) is actually not shielded by the support column 26, a scene where the measuring laser beam L corresponds to the set light shielding area As' becomes large. For example, in a case where the inclination state of the laser emitting mechanism 31 is as shown in FIG. 11A and FIG. 11B, even if the measuring laser beam L corresponds to the light shielding area As' in FIG. 12D, the measuring laser beam L (a part thereof) is actually not shielded by the support column 26 in a scene other than the light shielding area As in FIG. 12A. Similarly a scene where the measuring laser beam L corresponding to the set light shielding area As' becomes large. For example, in a case where the inclination state of the laser emitting mechanism 31 is as shown in FIG. 11C, even if the measuring laser beam L corresponds to the light shielding area As' in FIG. 12D, the measuring laser beam L (a part thereof) is actually not shielded by the support column 26 in a scene other than the light shielding area As in FIG. 12B. Therefore in the conventional laser measurement system, the area of enabling the appropriate measurement is narrowed inappropriately.

Next, other problems in the conventional technology will be explained with reference to FIGS. 14A and 14B, and FIGS. 15A and 15B. The other problems in the conventional technology will be the same as the problems in the laser measurement system 10 (rotary laser emitting apparatus 11 and the laser receiving apparatus 12) in the present embodiment in a case where the inclination adjusting processing that is described above is not executed therein, and therefore, will be explained with reference to signs identical to those in the laser measurement system 10 in the present embodiment. FIG. 15B emphatically shows a shift of a rotating axis At1 directed to a direction toward the laser receiving apparatus 12 (light receiving unit 71), from that direction for easy understanding.

In the conventional rotary laser emitting apparatus 11, in a case of adjusting the inclination of the reference plane Pb in the rotary laser emitting apparatus 11 on a basis of the position where the laser receiving apparatus 12 is installed, after the rotary laser emitting apparatus 11 is first made to a state similar to that in FIG. 14A, any one of the rotating axes (refer to signs At1, At2 in FIG. 14B) to the body case 24 of the laser emitting mechanism 31 in the rotary laser emitting apparatus 11 is directed to the laser receiving apparatus 12 (the light receiving unit 71). The rotating axes At1, At2, as described above, since the laser emitting mechanism 31 (emission unit housing 32 (the center axis (rotating axis Ar)) can be inclined to the body case 24 and a pair of inclination mechanisms 41 are provided for adjustment of the inclination and the direction in the rotary laser emitting apparatus 11, become directions of being able to be inclined by each of the inclination mechanisms 41. Here, in the example shown in the drawings, the rotating axis At1 in the rotary laser emitting apparatus 11 is set to be directed to the laser receiving apparatus 12 (the light receiving unit 71). In the laser receiving apparatus 12, the laser emitting mechanism 31 (emission unit housing 32 (the center axis (rotating axis Ar)) is rotated to the body case 24 by a predetermined angle (for example, an angle θp (refer to FIG. 14A)) around the rotating axis At1 as the rotation center by driving the inclination mechanism 41 corresponding to the rotating axis At1 under control of the light receiving-side control unit 73.

Figure 14B:
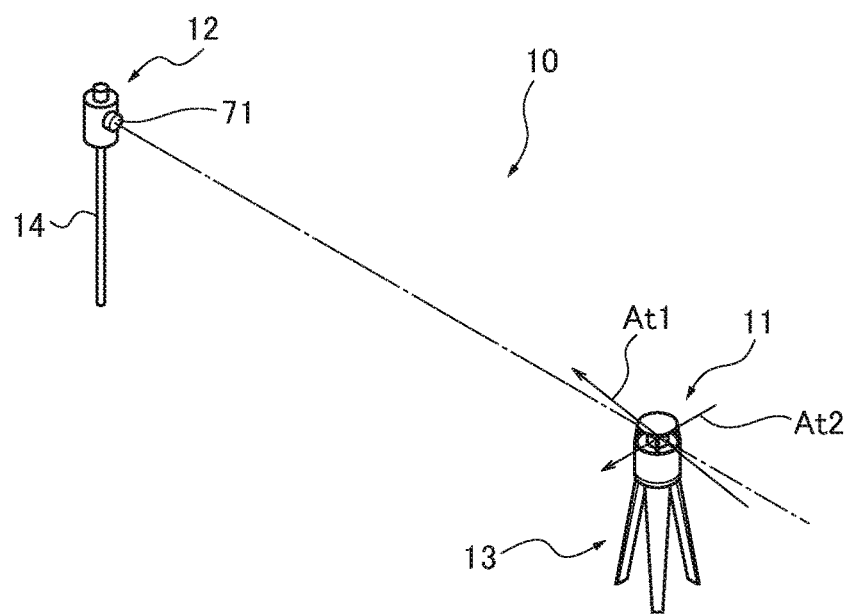
Figure 15B:
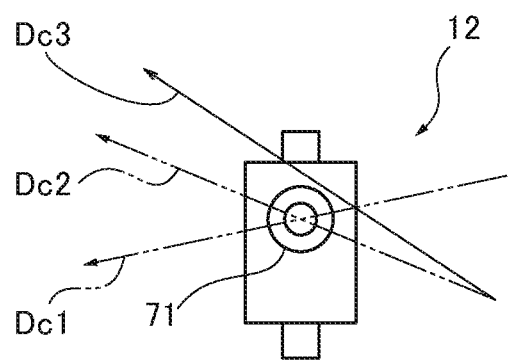

However, in the rotary laser emitting apparatus 11, for example, when the rotating axis At1 is directed to the laser receiving apparatus 12 (laser receiving portion 71) by visual measurement of an operator, it is very difficult to accurately make the rotating axis At1 in accordance with the laser receiving apparatus 12 (laser receiving portion 71) as shown in FIG. 14B. Therefore it is considered to ensure the accuracy of the measurement by measuring the position as viewed in the rotating direction of the laser receiving apparatus 12 (laser receiving portion 71) as viewed from the rotary laser emitting apparatus 11, which, however, leads to complication of the configuration, as well as complication of the work. In addition, when the rotating axis At1 is shifted from the direction to the laser receiving apparatus 12 (laser receiving portion 71), the reference plane Pb of the laser emitting mechanism 31 (emission unit housing 32) inclined around the rotating axis At1 as the rotation center differs from a target one. Therefore in the laser receiving apparatus 12, as shown in FIG. 15B, a direction where the irradiation optical axis Ai of the rotary laser emitting apparatus 11 crosses the light receiving unit 71 changes from direction Dc1 to direction Dc3 that is different from the original target direction Dc2. Therefore in the rotary laser emitting apparatus 11, the rotating and emitting measuring laser beam L (three irradiation optical beams S1, S2 and S3) is received in the light receiving unit 71 in the laser receiving apparatus 12, and a work of finely adjusting the direction where the irradiation optical axis Ai crosses the light receiving unit 71, that is, a direction of the rotating axis At1 of the rotary laser emitting apparatus is required. Therefore in the conventional laser measurement system 10, it is difficult to adjust the inclination of the reference plane Pb in the rotary laser emitting apparatus 11 around the straight line as the rotating axis, the straight line connecting the rotary laser emitting apparatus 11 (the emission unit (pentaprism 54 (emission window of the rotary body 23) of the emission laser emitting mechanism 31) and the laser receiving apparatus 12 (the receiving portion 71).

As to each of the above-mentioned problems in the conventional technology, in the rotary laser emitting apparatus 11 as one embodiment in the rotary laser emitting apparatus according to the present invention, the rotating posture signal Sr can be superimposed on the rotating and emitting measuring laser beam L (three irradiation optical beams S1, S2 and S3). Therefore in the rotary laser emitting apparatus 11, it is possible to obtain the rotating posture (rotating angle) of the irradiation optical axis Ai in the rotating direction around the center axis (rotating axis Ar) of the emission unit housing 32 in the rotary laser emitting apparatus 11.

In addition, since the rotating posture signal Sr is generated by changing the frequency corresponding to a change of the rotating angle between the reference position and the irradiation optical axis Ai in the rotary laser emitting apparatus 11, the rotating posture signal Sr can easily be superimposed on the rotating and emitting measuring laser beam L (three irradiation optical beams S1, S2 and S3).

Further, in the rotary laser emitting apparatus 11, the rotating posture signal Sr, which is a signal of which a frequency successively changes within a range from zero degrees to less than 360 degrees to the reference position as viewed in the rotating direction and corresponds one-to-one to the angle to the reference position, is superimposed on the rotating and emitting measuring laser beam L (three irradiation optical beams S1, S2 and S3). Therefore in the rotary laser emitting apparatus 11, a detailed position of the rotary body (laser emitting mechanism 31) as viewed in the rotating direction at the time of emitting the measuring laser beam L can be obtained in the light receiving apparatus 12 (light receiving-side control unit 73) with a simple configuration.

In the rotary laser emitting apparatus 11, based upon the inclination state (the information) of the emission unit housing 32 (laser emitting mechanism 31) to the body case 24 that is detected in the inclination state detecting unit 67 and the inclination (the information) of the emission unit housing 32 (laser emitting mechanism 31) in the vertical direction that is detected by each level sensor 49 as the vertical state detecting unit 66, the inclination and direction of the emission unit housing 32 (laser emitting mechanism 31) to the body case 24 are adjusted by the pair of inclination mechanisms 41 (inclination drive mechanism 64) under control of the emission-side control unit 61. Thereby the laser emitting mechanism 31 (emission unit housing 32) can be set to the posture of being always inclined in any direction and at any angle. Therefore in the rotary laser emitting apparatus 11, the three irradiation optical beams S1, S2 and S3 as the measuring laser beam L can be rotated and emitted by inclining the reference plane Pb in any direction and at any angle to the horizontal plane. As a result, in the rotary laser emitting apparatus 11, the emission-side control unit 61 obtains a direction of the laser receiving apparatus 12 (the light receiving unit 71) as viewed in the emission unit (pentaprism 54 (the emission window 28 of the rotary body 23)) of the laser emitting mechanism 31 based upon the information of the rotating posture (rotating angle) of the irradiation optical axis Ai in the rotating direction around the center axis (rotating axis Ar) of the emission unit housing 32. Therefore the emission-side control unit 61 can change the reference plane Pb around the adjustment reference axis Ap as the rotating axis set in that direction (in the above-mentioned example, from reference plane Pb1 to reference plane Pb2).

In the laser measurement system 10 as one embodiment of the laser measurement system according to the present invention, the rotary laser emitting apparatus 11 can superimpose the rotating posture signal Sr on the measuring laser beam L (three irradiation optical beams S1, S2 and S3) that is rotated and emitted. Therefore in the laser measurement system 10, the laser receiving apparatus 12 (light receiving-side control unit 73) can easily obtain the information of the rotating posture (rotating angle) of the irradiation optical axis Ai in the rotating direction around the center axis (rotating axis Ar) of the emission unit housing 32 in the rotary laser emitting apparatus 11. Form the above, in the light received-side control unit 73, the rotating posture (rotating angle) can be used for determination whether the received measuring laser beam L is appropriately emitted. Therefore in the laser measurement system 10, the light shielding area As can be defined by a rotating posture (rotating angle) as viewed in the emission unit in the laser emitting mechanism 31 that is the location where the measuring laser beam L is emitted in the rotary laser emitting apparatus 11, and a high-low angle θv to the reference plane Pb (irradiation optical Axis Ai) in the measuring laser beam L (three irradiation optical beams S1, S2 and S3) received in the laser receiving apparatus 12 (the light receiving unit 71). As a result, in the laser measurement system 10, the light shielding area As can be adapted more to the scene where the measuring laser beam L (a part thereof) is shielded by the support column 26, and the determination on whether the measuring laser beam L is appropriately emitted can be made more appropriate. Therefore in the laser measurement system 10, as compared to the above-mentioned configuration, the determination on whether the received measuring laser beam L (three irradiation optical beams S1, S2 and S3) is appropriately emitted from the rotary laser emitting apparatus 11 can be adapted to whether the measuring laser beam L (a part thereof) is actually shielded by the support column 26, preventing the area for enabling the measurement from being narrowed inappropriately. In other words, the laser measurement system 10 can accurately make the determination on whether the received measuring laser beam L is appropriately emitted from the rotary laser emitting apparatus 11 to accurately make the determination on whether the appropriate measurement is possible.

In the laser measurement system 10, the rotary laser emitting apparatus 11 superimposes the rotating posture signal Sr on the rotating and emitting measuring laser beam L (three irradiation optical beams S1, S2 and S3). Therefore in the laser measurement system 10, the light receiving-side control unit 73 in the laser receiving apparatus 12 can easily obtain the information of the rotating posture (rotating angle) of the irradiation optical axis Ai in the rotating direction around the center axis (rotating axis Ar) of the emission unit housing 32 in the rotary laser emitting apparatus 11. Therefore the light receiving-side control unit 73 sends the information of the rotating posture (rotating angle) to the emission-side control unit 61 in the rotary laser emitting apparatus 11, and thereby the emission-side control unit 61 obtains a direction of the laser receiving apparatus 12 (the light receiving unit 71) as viewed in the emission unit (pentaprism 54 (the emission window 28 of the rotary body 23)) of the laser emitting mechanism 31. From the above, the emission-side control unit 61 sets the direction of the laser receiving apparatus 12 as an adjustment reference axis Ap, and changes the reference plane Pb in the rotary laser emitting apparatus 11 around the adjustment reference axis Ap as the rotating axis (in the above example, from reference plane Pb1 to reference plane Pb2). Therefore in the laser measurement system 10, it is possible to easily and appropriately adjust the inclination of the reference plane Pb in the rotary laser emitting apparatus 11 around ab straight line as the rotating axis, the straight line connecting the rotary laser emitting apparatus 11 (the emission unit (pentaprism 54 (emission window 28 of the rotary body 23) of the laser emitting mechanism 31) and the laser receiving apparatus 12 (the receiving portion 71).

In the laser measurement system 10, the rotary laser emitting apparatus 11 superimposes the rotating posture signal Sr on the rotating and emitting measuring laser beam L (three irradiation optical beams S1, S2 and S3). Therefore in the laser measurement system 10, the light receiving-side control unit 73 in the laser receiving apparatus 12 can easily and surely obtain the information of the rotating posture (rotating angle) of the irradiation optical axis Ai in the rotating direction around the center axis (rotating axis Ar) of the emission unit housing 32 in the rotary laser emitting apparatus for using the rotating posture signal Sr for the determination on whether the measuring laser beam L is appropriately emitted. This is because, it is not necessary to provide communication means only for exchanging the information of the rotating posture (rotating angle) of the irradiation optical axis Ai in the rotating direction around the center axis (rotating axis Ar) of the emission unit housing 32 in the rotary laser emitting apparatus 11, and the measuring laser beam L is surely obtained by the laser receiving apparatus (the light receiving unit 71).

In the laser measurement system 10, the laser receiving apparatus 12 (the light receiving-side control unit 73) obtains the information of the rotating posture (rotating angle) from the rotating posture signal Sr of the received measuring laser beam L (three irradiation optical beams S1, S2 and S3), and the light shielding area As is used to execute the treatment determining processing of the received measuring laser beam L. Therefore in the laser measurement system 10, in a stage where the laser receiving apparatus 12 (the light receiving-side control unit 73) receives the measuring laser beam L, it is possible to appropriately make a determination on whether the measuring laser beam L is appropriately emitted.

In the laser measurement system 10, the rotary laser emitting apparatus 11 superimposes the rotating posture signal Sr on the rotating and emitting measuring laser beam L (three irradiation optical beams S1, S2 and S3). The rotating posture signal Sr shows the rotating posture of the rotary body 23 to the emission unit housing 32 from the reference position, that is, the rotating angle (direction where the irradiation optical axis Ai is directed) between the irradiation optical axis Ai and the reference position as viewed in the rotating direction. Therefore in the laser measurement system 10, the determination by the laser receiving apparatus 12 (the light receiving-side control unit 73) on whether the measuring laser beam L is appropriately emitted can be made easily and appropriately. This is as follows. In the determination on whether the measuring laser beam L is appropriately emitted, it is necessary to appropriately obtain a direction where the measuring laser beam L is emitted to the position of each support column 26. Therefore in the laser measurement system 10, the position of each support column 26 to the emission unit (pentaprism 54 (emission window 28 of the rotary body 23)) of the laser emitting mechanism 31 that is the emission position in the rotary laser emitting apparatus 11 and the position of the laser receiving apparatus 12 (the light receiving portion 71) to the rotary laser emitting apparatus 11 have to be treated on the same coordinate. Then it is required that the respective positions are accurately measured and the relationship of the respective coordinates is also obtained with high reliability. On the other hand, in the laser measurement system 10, the superimposed rotating posture signal Sr is made to show the rotating posture of the rotary body 23 to the emission unit housing 32 from the reference position, that is, the rotating angle (direction where the irradiation optical axis Ai is directed) between the irradiation optical axis Ai and the reference position as viewed in the rotating angle. Therefore the light shielding area As can be set based upon the position as viewed in the rotating direction (rotating angle) of each support column 26 to the reference position in the rotary laser emitting apparatus 11. In addition, in the laser measurement system 10, the rotating posture signal Sr is superimposed on the rotating and emitting measuring laser beam L (three irradiation optical beams S1, S2 and S3), and therefore similarly to the regular measurement, the laser receiving apparatus 12 (the light receiving unit 71) is only made to receive the measuring laser beam L. Therefore in the laser measurement system 10, it is possible to appropriately make the determination on whether the measuring laser beam L is appropriately emitted without performing the measurement and calculation for treating on the same coordinate the position of each support column 26 to the emission unit of the emission laser emitting mechanism 31 that is the emission position in the rotary laser emitting apparatus 11 and the position of the laser receiving apparatus 12 (the receiving portion 71) to the rotary laser emitting apparatus 11. As a result, in the laser measurement system 10, it is possible to easily and appropriately make the determination on whether the measuring laser beam L is appropriately emitted.

In the laser measurement system 10, the rotary laser emitting apparatus 11 superimposes the rotating posture signal Sr on the rotating and emitting measuring laser beam L (three irradiation optical beams S1, S2 and S3). The rotating posture signal Sr is formed as a signal of which a frequency successively changes within a range from zero degrees to less than 360 degrees to the reference position as viewed in the rotating direction and corresponds one-to-one to the rotating angle to the reference position. Therefore in the laser measurement system 10, a detailed position of the rotary body (laser emitting mechanism 31) as viewed in the rotating direction thereof at the time of emitting the measuring laser beam L in the rotary laser emitting apparatus 11 can be obtained in the light receiving apparatus 12 (light receiving-side control unit 73) with a simple configuration. As a result, in the laser measurement system 10, it is possible to more accurately set the light shielding area As to appropriately make the determination on whether the measuring laser beam L is appropriately emitted.

In the laser measurement system 10, the detailed position of the rotary body 23 (laser emitting mechanism 31) as viewed in the rotating direction thereof at the time of emitting the measuring laser beam L (three irradiation laser beams S1, S2 and S3) in the rotary laser emitting apparatus 11 can be obtained in the light receiving apparatus 12 (light receiving-side control unit 73). As a result, the emission-side control unit 61 can set the adjustment reference axis Ap easily and in more detail. Therefore the emission-side control unit 61 can change the reference plane Pb in the rotary laser emitting apparatus 11 from reference plane Pb1 to reference plane Pb2 around the adjustment reference axis Ap as the rotating axis. Therefore in the laser measurement system 10, it is possible to easily and more appropriately adjust the inclination of the reference plane Pb in the rotary laser emitting apparatus 11 around the straight line as the rotating axis, the straight line connecting the rotary laser emitting apparatus 11 (the emission unit (pentaprism 54 (emission window 28 of the rotary body 23)) of the emission laser emitting mechanism 31) and the laser receiving apparatus (the receiving portion 71).

Therefore in the laser measurement system 10, the laser receiving apparatus 12 (the light receiving-side control unit 73) can obtain from the received measuring laser beam L (three irradiation optical beams S1, S2 and S3), a rotating posture (rotating angle) of the irradiation optical axis Ai in the rotating direction around the center axis (rotating axis Ar) of the emission unit housing 32 and a high-low angle θv to the reference plane Pb (irradiation optical axis Ai), as viewed in the emission unit in the laser emitting mechanism 31 in the rotary laser emitting apparatus 11. Therefore in the laser measurement system 10, when the laser receiving apparatus 12 (the light receiving-side control unit 73) receives the measuring laser beam L, it is possible to determine whether the measuring laser beam L is within the light shielding area As from the rotating posture (rotating angle) and the high-low angle θv. Therefore in the laser measurement system 10, as similar to the regular measurement, it is possible to more appropriately determine whether the received measuring laser beam L is appropriately emitted only by causing the laser receiving apparatus 12 to receive the rotating and emitting measuring laser beam L (three irradiation optical beams S1, S2 and S3) by the rotary laser emitting apparatus 11.

In the laser measurement system 10, the laser receiving apparatus 12 (the light receiving-side control unit 73) can obtain a rotating posture (rotating angle) of the irradiation optical axis Ai in the rotating direction around the center axis (rotating axis Ar) of the emission unit housing 32 as viewed in the emission unit in the laser emitting mechanism 31 in the rotary laser emitting apparatus 11, from the rotating posture signal Sr superimposed on the received measuring laser beam L (three irradiation optical beams S1, S2 and S3). Therefore in the laser measurement system 10, with a simple configuration, the laser receiving apparatus 12 (the light receiving-side control unit 73) can certainly obtain the position as viewed in the rotating direction of the rotary body 23 (laser emitting mechanism 31) in the rotary laser emitting apparatus 11. This is because, when the rotary laser emitting apparatus 11 and the laser receiving apparatus 12 are used to perform the measurement, a work of causing the laser receiving apparatus 12 (the light receiving unit 71) to receive the measuring laser beam L (three irradiation optical beams S1, S2 and S3) is necessary.

In the laser measurement system 10, the rotary laser emitting apparatus 11 rotates and emits three irradiation optical beams S1, S2 and S3 as the measuring laser beam L. Therefore in the laser measurement system 10, the laser receiving apparatus 12 (the light receiving-side control unit 73) can find the high-low angle θv to the reference plane Pb (irradiation optical axis Ai) as viewed in the emission unit in the laser emitting mechanism 31 in the rotary laser emitting apparatus 11, from the received three irradiation optical beams S1, S2 and S3 (the measuring laser beam L). Therefore in the laser measurement system 10, with a simple configuration, the laser receiving apparatus 12 (the light receiving-side control unit 73) can certainly obtain the rotating posture (rotating angle) of the irradiation optical axis Ai in the rotating direction around the center axis (rotating axis Ar) of the emission unit housing 32 and the high-low angle θv to the reference plane Pb (irradiation optical axis Ai), as viewed in the emission unit in the laser emitting mechanism 31 in the rotary laser emitting apparatus 11.

In the laser measurement system 10, the rotary laser emitting apparatus 11 rotates and emits three irradiation optical beams S1, S2 and S3, which are formed as fan beams, as the measuring laser beam L. Therefore in the laser measurement system 10, the laser receiving apparatus 12 (the light receiving-side control unit 73) can easily and appropriately find the high-low angle θv to the reference plane Pb (irradiation optical axis Ai) as viewed in the emission unit in the laser emitting mechanism 31 in the rotary laser emitting apparatus 11, from the received three irradiation optical beams S1, S2 and S3 (the measuring laser beam L) regardless of a distance from the rotary laser emitting apparatus 11. Therefore in the laser measurement system 10, the laser receiving apparatus 12 (the light receiving-side control unit 73) can easily and appropriately obtain the rotating posture (rotating angle) of the irradiation optical axis Ai in the rotating direction around the center axis (rotating axis Ar) of the emission unit housing 32 and the high-low angle θv to the reference plane Pb (irradiation optical axis Ai), as viewed in the emission unit in the laser emitting mechanism 31 in the rotary laser emitting apparatus 11 regardless of a distance from the rotary laser emitting apparatus 11.

In the laser measurement system 10, the light shielding area As is set to correspond to a position of the support column 26 as viewed in the emission unit (pentaprism 54 (emission window 28 of the rotary body 23) of the laser emitting mechanism 31 that is the location where the measuring laser beam L is emitted in the rotary laser emitting apparatus 11. In addition, in the laser measurement system 10, it is determined whether an optical beam state of the measuring laser beam L received in the laser receiving apparatus 12 (the light receiving unit 71) is within the light shielding area As, and thereby it is determined whether the measuring laser beam L is appropriately emitted. Therefore in the laser measurement system 10, it is possible to easily and appropriately determine that the measuring laser beam L is not appropriately emitted from the rotary laser emitting apparatus 11 due to being shielded by the support column 26.

In the laser measurement system 10, since the rotary laser emitting apparatus 11 superimposes the rotating posture signal Sr on the rotating and emitting measuring laser beam L (three irradiation optical beams S1, S2 and S3), the laser receiving apparatus 12 (the light receiving-side control unit 73) can easily obtain information of a rotating posture (rotating angle) of the irradiation optical axis Ai in the rotating direction around the center axis (rotating axis Ar) of the emission unit housing 32 in the rotary laser emitting apparatus 11. Therefore in the laser measurement system 10, the light shielding area As (the information) is changed with a change in the inclination state (inclination and the direction) to the body case 24 of the emission unit housing 32 (laser emitting mechanism 31) in the rotary laser emitting apparatus 11, and thereby it is possible to determine whether the measuring laser beam L is appropriately emitted corresponding to the actual inclination state. That is, in the laser measurement system 10, it is determined whether an optical beam state of the measuring laser beam L received in the laser receiving apparatus 12 (the light receiving unit 71) is within the light shielding area As corresponding to the actual inclination state, and, based upon the determination, it is determined whether the measuring laser beam L is appropriately emitted from the rotary laser emitting apparatus 11. Therefore the laser measurement system 10 can prevent the determination that the measuring laser beam L is not appropriately emitted from the rotary laser emitting apparatus 11 regardless of the appropriately emitted measuring laser beam L due to the event that the optical beam state of the measuring laser beam L received in the laser receiving apparatus 12 (the light receiving unit 71) is within a light shielding area As corresponding to a different inclination state. Therefore in the laser measurement system 10, as compared to the above-mentioned configuration, it is possible to make the determination on whether the received measuring laser beam L is appropriately emitted from the rotary laser emitting apparatus 11 by more appropriately corresponding to the actual rotary laser emitting apparatus 11, certainly preventing the area for enabling the measurement from being narrowed inappropriately. In other words, the laser measurement system 10 can more accurately make the determination on whether the received measuring laser beam L is appropriately emitted from the rotary laser emitting apparatus 11 to accurately make the determination on whether the appropriate measurement is possible.

In the laser measurement system 10, the rotary laser emitting apparatus 11 adjusts the inclination and direction of the emission unit housing 32 (laser emitting mechanism 31) to the body case 24 by the inclination drive mechanism 64 such that each level sensor 49 as the vertical state detecting unit 66 always detects a target value. Thereby the laser emitting mechanism 31 (emission unit housing 32) can be made to the posture of being always inclined in any direction and at any angle. The rotary laser emitting apparatus 11 can rotate and emit the measuring laser beam L (the three irradiation optical beams S1, S2 and S3) by inclining the reference plane Pb in any direction and at any angle to the horizontal plane. In addition, in the laser measurement system 10, the light shielding area As (the information) changes corresponding to a change in the inclination state (inclination and its direction) of the emission unit housing 32 to the body case in the rotary laser emitting apparatus 11. Therefore determination on whether the measuring laser beam L in which the reference plane Pb is inclined in any direction and at any angle to the horizontal plane is also appropriately emitted can be appropriately made corresponding to the state of the rotary laser emitting apparatus 11.

In the laser measurement system 10, the rotary laser emitting apparatus 11 superimposes the rotating posture signal Sr on the rotating and emitting measuring laser beam L (three irradiation optical beams S1, S2 and S3). Therefore the laser receiving apparatus 12 (light receiving-side control unit 73) can easily obtain the information of the rotating posture (rotating angle) of the irradiation optical axis Ai in the rotating direction around the center axis (rotating axis Ar) of the emission unit housing 32 in the rotary laser emitting apparatus 11. In addition, the rotary laser emitting apparatus 11 adjusts the inclination and direction of the emission unit housing 32 (laser emitting mechanism 31) to the body case 24 by the inclination drive mechanism 64 such that each level sensor 49 as the vertical state detecting unit 66 always detects a target value. Thereby the laser emitting mechanism 31 (emission unit housing 32) can be made to the posture of being always inclined in any direction and at any angle. Therefore in the laser measurement system 10, the emission-side control unit 61 obtains the information of the rotating posture (rotating angle) from the light receiving-side control unit 73, and thereby it is possible to easily and appropriately adjust the inclination of the reference plane Pb in the rotary laser emitting apparatus 11 around the straight line as the rotating axis, the straight line connecting the rotary laser emitting apparatus 11 (the emission unit (pentaprism 54 (emission window 28 of the rotary body 23) of the emission laser emitting mechanism 31) and the laser receiving apparatus 12 (the receiving portion 71).

Accordingly, in the rotary laser emitting apparatus 11 as the embodiment in the rotary laser emitting apparatus according to the present invention, it is possible to find the position of the laser receiving apparatus 12 as viewed in the rotating direction around the rotating axis Ar in the rotary laser emitting apparatus 11.

It should be noted that in the above-mentioned embodiment, the rotary laser emitting apparatus 11 is explained as one embodiment in the rotary laser emitting apparatus according to the present invention, but a rotary laser emitting apparatus that rotates and emits a laser beam may comprise an emission-side control unit that controls an entire operation of the apparatus, a laser emitting mechanism that emits the laser beam while rotating an irradiation optical axis that is an emission direction of the laser beam and, and a rotating direction detecting unit that detects a rotating direction of the irradiation optical axis, wherein the emission-side control unit generates a rotating posture signal showing the rotating direction of the irradiation optical axis detected by the rotating direction detecting unit, and drives the laser emitting mechanism for superimposing the rotating posture signal on the laser beam, and is not limited to the above-mentioned embodiment.

In addition, in the above-mentioned embodiment, the rotary laser emitting apparatus 11 configuring a part of the laser measurement system 10 is explained as one embodiment in the rotary laser emitting apparatus according to the present invention, but as long as a rotary laser emitting apparatus is configured such that the emission-side control unit generates a rotating posture signal showing the rotating direction of the irradiation optical axis detected by the rotating direction detecting unit, and drives the laser emitting mechanism for superimposing the rotating posture signal on the laser beam, the rotary laser emitting apparatus may be one as a general laser product that simply rotates and emits the laser beam, may be a rotary laser emitting apparatus that is not formed to configure a part of the laser measurement system 10 or may be a rotary laser emitting apparatus that rotates and emits a laser beam for a target reflecting the laser beam and measures an inclination angle and a height to a plane vertical to a rotating axis in the target based upon the reflected laser beam, and is not limited to the above-mentioned embodiment.

Further, in the above-mentioned embodiment, the emission-side control unit 61 in the rotary laser emitting apparatus 11 generates a rotating posture signal Sr and drives the laser beam emitting unit 51 in response to the rotating posture signal Sr through the optical source drive unit 62, thereby superimposing the rotating posture signal Sr on a measuring laser beam L (three irradiation optical beams S1, S2 and S3), but as long as the emission-side control unit 61 is controlled to superimpose the rotating posture signal showing the rotating direction of the irradiation optical axis Ai detected by the rotating angle detecting unit 65 on the measuring laser beam L (three irradiation optical beams S1, S2 and S3) that is emitted from laser emitting mechanism 31, the other configuration may be adopted, and is not limited to the above-mentioned embodiment.

In the above-mentioned embodiment, the rotary laser emitting apparatus 11 (the emission-side control unit 61) generates the rotating posture signal Sr by changing the frequency with a change in the rotating angle between the reference position and the irradiation optical axis Ai, but as long as a rotary laser emitting apparatus superimposes the rotating posture signal showing the rotating posture of the rotary body 23 to the emission unit housing 32 from the reference position, that is, the rotating angle (direction where the irradiation optical beam Ai is directed) between the irradiation optical axis Ai and the reference position as viewed in the rotating angle on the rotating and emitting measuring laser beam L (three irradiation optical beams S1, S2 and S3), and the emission-side control unit is not limited to the above-mentioned embodiment.

In the above-mentioned embodiment, the rotary laser emitting apparatus 11 (the emission-side control unit 61) generates the rotating posture signal Sr that is a signal of which a frequency successively changes within a range from zero degrees to less than 360 degrees to the reference position as viewed in the rotating direction and corresponds one-to-one to the angle (rotating angle) to the reference position, but an emission-side control unit may superimpose the rotating posture signal showing the rotating posture of the rotary body 23 to the emission unit housing 32 from the reference position, that is, the rotating angle (direction where the irradiation optical axis Ai is directed) between the irradiation optical axis Ai and the reference position as viewed in the rotating angle on the rotating and emitting measuring laser beam L (three irradiation optical beams S1, S2 and S3), and is not limited to the above-mentioned embodiment.

In the above-mentioned embodiment, the laser receiving apparatus 12 (the light receiving-side control unit 73) can obtain the high-low angle θv to the reference plane Pb (irradiation optical axis Ai) as viewed in the emission unit in the laser emitting mechanism 31 in the rotary laser emitting apparatus 11, from the received measuring laser beam L (three irradiation optical beams S1, S2 and S3), but as long as the high-low angle θv is obtained, the other means may be used (for example, the light receiving-side communication unit 80 or the input unit is used) to obtain the high-low angle θv, and the light receiving-side control unit is not limited to the above-mentioned embodiment.

In the above-mentioned embodiment, the rotary laser emitting apparatus 11 rotates and emits the three irradiation optical beams S1, S2 and S3 as the measuring laser beam L, but a rotary laser emitting apparatus may rotate and emit a single optical beam, and is not limited to the above-mentioned embodiment. In this case, the laser receiving apparatus 12 (the light receiving-side control unit 73) is preferably configured to be able to determine the high-low angle θv to the reference plane Pb (irradiation optical axis Ai). As to such a configuration, for example, a light receiving unit in the laser receiving apparatus 12 is formed in a rectangular shape in parallel to the vertical direction and the horizontal direction as a whole, and two light receiving areas that are sectioned by a division line inclined to the vertical direction and the horizontal direction are provided. Thereby it is possible to determine the high-low angle θv to the reference plane Pb (irradiation optical axis Ai) in the concept similar to the above-mentioned embodiment.

In the above-mentioned embodiment, the measuring laser beam L that is emitted from the laser beam emitting unit 51 is formed into three irradiation optical beams S1, S2 and S3 by the diffracting grating 53, but each of the three irradiation optical beams S1, S2 and S3 may be emitted from a different optical source (corresponding to the laser beam emitting unit 51), and formation of three irradiation optical beams S1, S2 and S3 is not limited to the above-mentioned embodiment. In such a configuration, the rotating posture signal Sr may be superimposed on at least one of the three irradiation optical beams S1, S2 and S3. That is, the information superimposing processing may be executed to at least one of three optical sources that emit the three irradiation optical beams S1, S2 and S3, as similar to the above-mentioned laser beam emitting unit 51.

In the above-mentioned embodiment, the laser receiving apparatus 12 (light receiving-side control unit 73) determines whether the received measuring laser beam L is appropriately emitted from the rotary laser emitting apparatus 11, but in the laser receiving beam L (three irradiation optical beams S1, S2 and S3) received in the laser receiving apparatus 12 (the light receiving unit 71), the laser receiving apparatus 12 may determine whether the received measuring laser beam L is appropriately emitted from the rotary laser emitting apparatus 11 by using the rotating posture (rotating angle) of the irradiation optical axis Ai in the rotating direction around the center axis (rotating axis Ar) of the emitting unit housing 32 and the high-low angle θv to the reference plane Pb (irradiation optical axis Ai), as viewed in the emission unit in the laser emitting mechanism 31 that is the location where the measuring laser beam L is emitted in the rotary laser emitting apparatus 11, and is not limited to the above-mentioned embodiment.

In the above-mentioned embodiment, the four support columns 26 are provided in the body case 24 in the rotary laser emitting apparatus 11, but the number and shape of the support column 26 may be set as needed, and is not limited to the above-mentioned embodiment.

Advantages of the Invention

According to the rotary laser emitting apparatus in the present invention, it is possible to find the position of the laser receiving apparatus as viewed in the rotating direction around the rotating axis in the rotary laser emitting apparatus.

In addition to the above-mentioned configuration, when the emission-side control unit is configured to change the frequency in response to a change in the rotating angle of the irradiation optical axis to generate the rotating posture signal, the rotary laser emitting apparatus can easily superimpose the rotating posture signal on the rotating and emitting laser beam.

In addition to the above-mentioned configuration, when the emission-side control unit is configured to associate the frequency with the changing rotating angle of the irradiation optical axis one-to-one to generate the rotating posture signal, the emission-side control unit can cause the laser receiving apparatus to obtain the rotating direction of the irradiation optical axis at the time of emitting the laser beam in the rotary laser emitting apparatus with a simple configuration.

In addition to the above-mentioned configuration, the rotary laser emitting apparatus further comprises a body case that supports the laser emitting mechanism to be capable of being inclined, an inclination state detecting unit that detects an inclination state to the body case in the laser emitting mechanism, a vertical state detecting unit that detects an inclination of the laser emitting mechanism to a vertical direction, and an inclination mechanism that adjusts an inclination and direction of the laser emitting mechanism to the body case, wherein when the emission-side control unit is configured to cause the inclination mechanism to incline the laser emitting mechanism in any direction and at any angle, based upon the inclination state detected by the inclination state detecting unit and the inclination of the laser emitting mechanism to the vertical direction detected by the vertical state detecting unit, it is possible to easily and appropriately adjust the inclination of the reference plane in the rotary laser emitting apparatus around the straight line connection the rotary laser emitting apparatus and the laser receiving apparatus as the rotating axis.

In a laser measurement system including the rotary laser emitting apparatus that is configured as above, and a laser receiving apparatus that receives a laser beam emitted from the rotary laser emitting apparatus to perform measurement of a light receiving position thereof, when the laser receiving apparatus includes a light receiving-side control unit that controls an entire operation, the light receiving-side control unit being configured to extract the rotating posture signal from the laser beam received in the laser receiving apparatus and obtain a rotating direction of the irradiation optical axis from the rotating posture signal, the light receiving-side control unit can easily find the position of the laser receiving apparatus as viewed in the rotating direction around the rotating axis in the rotary laser emitting apparatus.

In addition to the above-mentioned configuration, when the light receiving-side control unit is configured to obtain a high-low angle to a reference plane including the irradiation optical axis in a laser beam received in the laser receiving apparatus, from the laser beam, the light receiving-side control unit can easily and certainly obtain information of the high-low angle to the reference plane including the irradiation optical axis in the laser beam received in the laser receiving apparatus.

In addition to the above-mentioned configuration, when the rotary laser emitting apparatus is configured to rotate and emit laser beams having two irradiation optical beams extending in parallel at an interval on a plane vertical to the irradiation optical axis and an irradiation optical beam inclined to the two irradiation optical beams therebetween, and the light receiving-side control unit is configured to obtain the high-low angle based upon a time interval between the respective irradiation optical beams of the laser beams that are emitted from the rotary laser emitting apparatus and are received in the laser receiving apparatus, the light receiving-side control unit can more appropriately obtain the high-low angle to the reference plane including the irradiation optical axis in the laser beam received in the laser receiving apparatus.

In addition to the above-mentioned configuration, when the rotary laser emitting apparatus is configured to form the respective irradiation optical beams with fan beams each having a divergent fan shape spreading as is away from the emission location, the laser receiving apparatus (light receiving-side control unit) can easily and more appropriately obtain the high-low angle to the reference plane including the irradiation optical axis in the laser beam received in the laser receiving apparatus from the received laser beam regardless of a distance from the rotary laser emitting apparatus.

As described above, the laser measurement system in the present invention is so far explained based upon the embodiment, but a specific configuration thereof is not limited to the above-mentioned embodiment, and it should be understood that changes, additions and the like in a design thereof are allowable within a scope not departing from the subject of the present invention.

What is claimed is:
1. A rotary laser emitting apparatus that rotates and emits a laser beam, comprising:
  an emission-side control unit that controls an entire operation of the apparatus;
  a laser emitting mechanism that emits the laser beam while rotating an a irradiation optical axis that is an emission direction of the laser beam; and
  a rotating direction detecting unit that detects a rotating direction of the irradiation optical axis, wherein the emission-side control unit includes superimposing means that generates a rotating posture signal showing the rotating direction of the irradiation optical axis detected by the rotating direction detecting unit, and superimposes the rotating posture signal on the laser beam,
  wherein the superimposing means includes:

a rotating posture signal generating circuit that generates the rotating posture signal, a carrier wave generating circuit that receives the rotating posture signal generated in the rotating posture signal generating circuit and generates a carrier wave carrying the rotational posture signal, and an output signal generating circuit that generates a signal combining the rotating posture signal generated in the rotating posture signal generating circuit and the carrier wave generated in the carrier wave generating circuit.

2. The rotary laser emitting apparatus according to claim 1, wherein the emission-side control unit changes a frequency in response to a change in the rotating angle of the irradiation optical axis to generate the rotating posture signal.

3. The rotary laser emitting apparatus according to claim 2, wherein the emission-side control unit associates the frequency with the changing rotating angle of the irradiation optical axis one-to-one to generate the rotating posture signal.

4. The rotary laser emitting apparatus according to claim 1, further comprising:

a body case that supports the laser emitting mechanism to be capable of being inclined;

an inclination state detecting unit that detects an inclination state of the laser emitting mechanism to the body case;

a vertical state detecting unit that detects an inclination of the laser emitting mechanism to a vertical direction; and an inclination mechanism that adjusts an inclination and direction of the laser emitting mechanism to the body case, wherein the emission-side control unit inclines the laser emitting mechanism in any direction and at any angle by the inclination mechanism, based upon the inclination state detected by the inclination state detecting unit and the inclination of the laser emitting mechanism to the vertical direction detected by the vertical state detecting unit.

5. A laser measurement system comprising:

a rotary laser emitting apparatus that rotates and emits a laser beam; and a laser receiving apparatus, the rotary laser emitting apparatus including:

an emission-side control unit that controls an entire operation of the apparatus;

a laser emitting mechanism that emits the laser beam while rotating an a irradiation optical axis that is an emission direction of the laser beam; and a rotating direction detecting unit that detects a rotating direction of the irradiation optical axis, wherein the emission-side control unit includes superimposing means that generates a rotating posture signal showing the rotating direction of the irradiation optical axis detected by the rotating direction detecting unit and superimposes the rotating posture signal on the laser beam, wherein the superimposing means includes:

a rotating posture signal generating circuit that generates the rotating posture signal, a carrier wave generating circuit that receives the rotating posture signal generated in the rotating posture signal generating circuit and generates a carrier wave carrying the rotational posture signal, and an output signal generating circuit that generates a signal combining the rotating posture signal generated in the rotating posture signal generating circuit and the carrier wave generated in the carrier wave generating circuit, wherein the laser receiving apparatus receives the laser beam emitted from the rotary laser emitting apparatus to perform measurement of a light receiving position thereof, wherein the laser receiving apparatus includes a light receiving-side control unit that controls an entire operation of the apparatus, wherein the light receiving-side control unit extracts the rotating posture signal from the laser beam received in the laser receiving apparatus and obtains a rotating direction of the irradiation optical axis from the rotating posture signal.

6. The laser measurement system according to claim 5, wherein the light receiving-side control unit obtains a high-low angle to a reference plane including the irradiation optical axis in the laser beam received in the laser receiving apparatus, from the laser beam.

7. The laser measurement system according to claim 6, wherein the rotary laser emitting apparatus rotates and emits laser beams having two irradiation optical beams extending in parallel at an interval on a plane vertical to the irradiation optical axis and having an irradiation optical beam inclined to the two irradiation optical beams therebetween, and the light receiving-side control unit obtains the high-low angle based upon a time interval between the respective irradiation optical beams of the laser beams that are emitted from the rotary laser emitting apparatus and are received in the laser receiving apparatus.

8. The laser measurement system according to claim 7, wherein the rotary laser emitting apparatus forms the respective irradiation optical beams with fan beams each having a divergent fan shape spreading as is away from the emission location.

* * * * *